United States Patent
Hashizume

(10) Patent No.: US 8,576,309 B2
(45) Date of Patent: Nov. 5, 2013

(54) PIXEL DEFECT CORRECTION DEVICE, IMAGING APPARATUS, PIXEL DEFECT CORRECTION METHOD, AND PROGRAM

(75) Inventor: Jun Hashizume, Tokyo (JP)

(73) Assignee: Sony Corporation, Tokyo (JP)

( * ) Notice: Subject to any disclaimer, the term of this patent is extended or adjusted under 35 U.S.C. 154(b) by 294 days.

(21) Appl. No.: 12/923,879

(22) Filed: Oct. 13, 2010

(65) Prior Publication Data
US 2011/0102624 A1    May 5, 2011

(30) Foreign Application Priority Data

Nov. 2, 2009   (JP) .................... 2009-252448
Apr. 1, 2010   (JP) .................... 2010-085351

(51) Int. Cl.
| H04N 9/64 | (2006.01) |
| H04N 5/228 | (2006.01) |
| H04N 5/208 | (2006.01) |
| G06K 9/48 | (2006.01) |
| G06K 9/40 | (2006.01) |
| G06K 9/00 | (2006.01) |

(52) U.S. Cl.
USPC ........ 348/246; 348/222.1; 348/252; 348/245; 382/199; 382/266; 382/269; 382/275; 382/162

(58) Field of Classification Search
USPC ............... 348/246, 247, 252, 245, 248, 239, 348/222.1; 382/199, 266, 269, 275, 382/162–167, 254
See application file for complete search history.

(56) References Cited

U.S. PATENT DOCUMENTS

| 7,068,854 | B1 * | 6/2006 | Aufrichtig et al. | 382/275 |
| 7,944,488 | B2 * | 5/2011 | Post | 348/246 |
| 2002/0196354 | A1 * | 12/2002 | Chang et al. | 348/246 |
| 2005/0219390 | A1 * | 10/2005 | Tajima et al. | 348/246 |
| 2006/0012694 | A1 * | 1/2006 | Yoneda et al. | 348/246 |
| 2008/0152230 | A1 * | 6/2008 | Forutanpour | 382/209 |
| 2008/0266428 | A1 * | 10/2008 | Egawa | 348/246 |
| 2010/0215266 | A1 * | 8/2010 | Higuchi | 382/167 |
| 2011/0080505 | A1 * | 4/2011 | Ogino | 348/246 |

FOREIGN PATENT DOCUMENTS

| JP | 2005-318383 | 11/2005 |
| JP | 2008-154276 | 7/2008 |

* cited by examiner

*Primary Examiner* — Nhan T Tran
*Assistant Examiner* — Marly Camargo
(74) *Attorney, Agent, or Firm* — Rader, Fishman & Grauer PLLC

(57) ABSTRACT

A pixel defect correction device includes: a defect determining section determining whether a pixel of interest of an image, in which pixels each having a pixel value are arrayed in a two-dimensional manner, is a defect of the image; a gradient detecting section detecting a gradient or an edge in a processing region, which includes pixels with the pixel of interest in the middle, based on values of at least peripheral pixels around the pixel of interest which are included in the processing region; a correction value acquisition section selecting a pixel, which is used for acquisition of a correction value of the pixel of interest, according to the detected gradient or edge and acquiring the correction value from a value of the selected pixel; and a defective pixel replacing section replacing the value of the pixel of interest with the correction value when the pixel of interest is determined to be a defect.

44 Claims, 18 Drawing Sheets

BAYER ARRANGEMENT

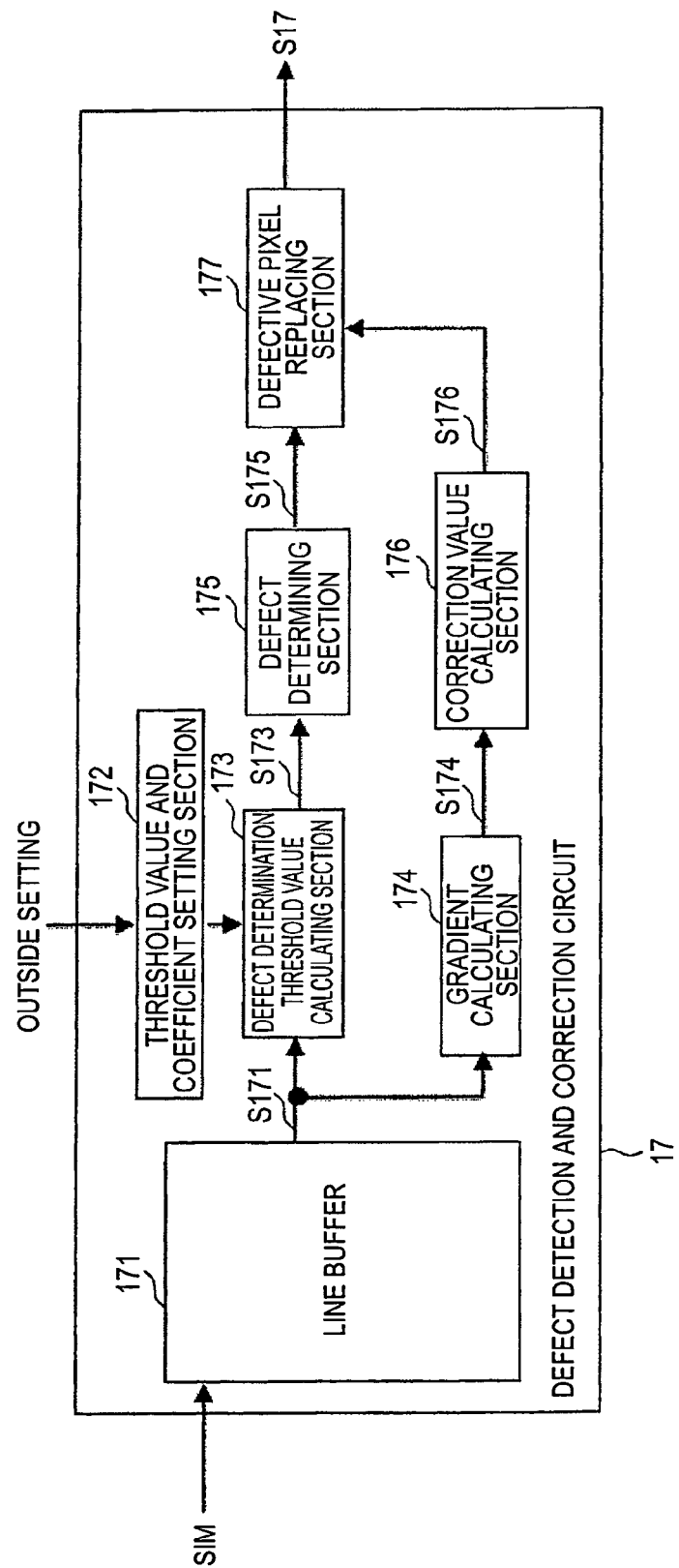

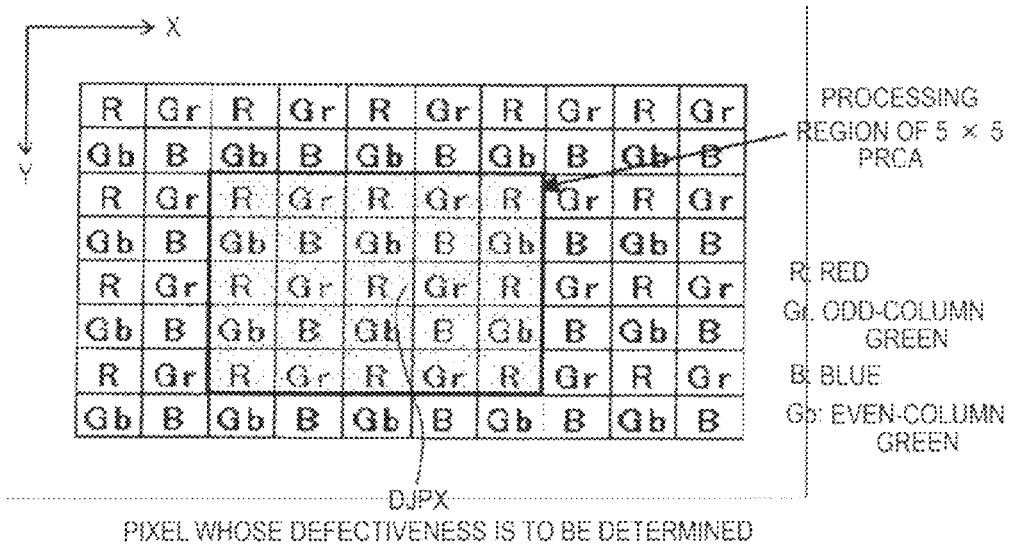

CALCULATION OF GRADIENT IN LONGITUDINAL DIRECTION

CALCULATION OF GRADIENT IN HORIZONTAL DIRECTION

CALCULATION OF GRADIENT IN UPPER RIGHT DIRECTION

CALCULATION OF GRADIENT IN UPPER LEFT DIRECTION

| 281 | 270 | 355 | 298 | 372 |
|---|---|---|---|---|
| 119 | 186 | 131 | 223 | 158 |
| 172 | 139 | 484 | 133 | 167 |
| 176 | 261 | 152 | 213 | 135 |
| 418 | 287 | 381 | 260 | 316 |

FIG.13

| 856 | 942 | 1007 | 1051 |
|---|---|---|---|
| 616 | 940 | 971 | 681 |
| 748 | 1036 | 982 | 648 |
| 1142 | 1071 | 996 | 924 |

FIG.14

| 575 | 587 | 652 | 679 |
|---|---|---|---|
| 444 | 456 | 487 | 514 |
| 576 | 552 | 498 | 481 |
| 724 | 700 | 625 | 608 |

WHITE DEFECT

BLACK DEFECT

WHITE DEFECT COUPLET

BLACK DEFECT COUPLET

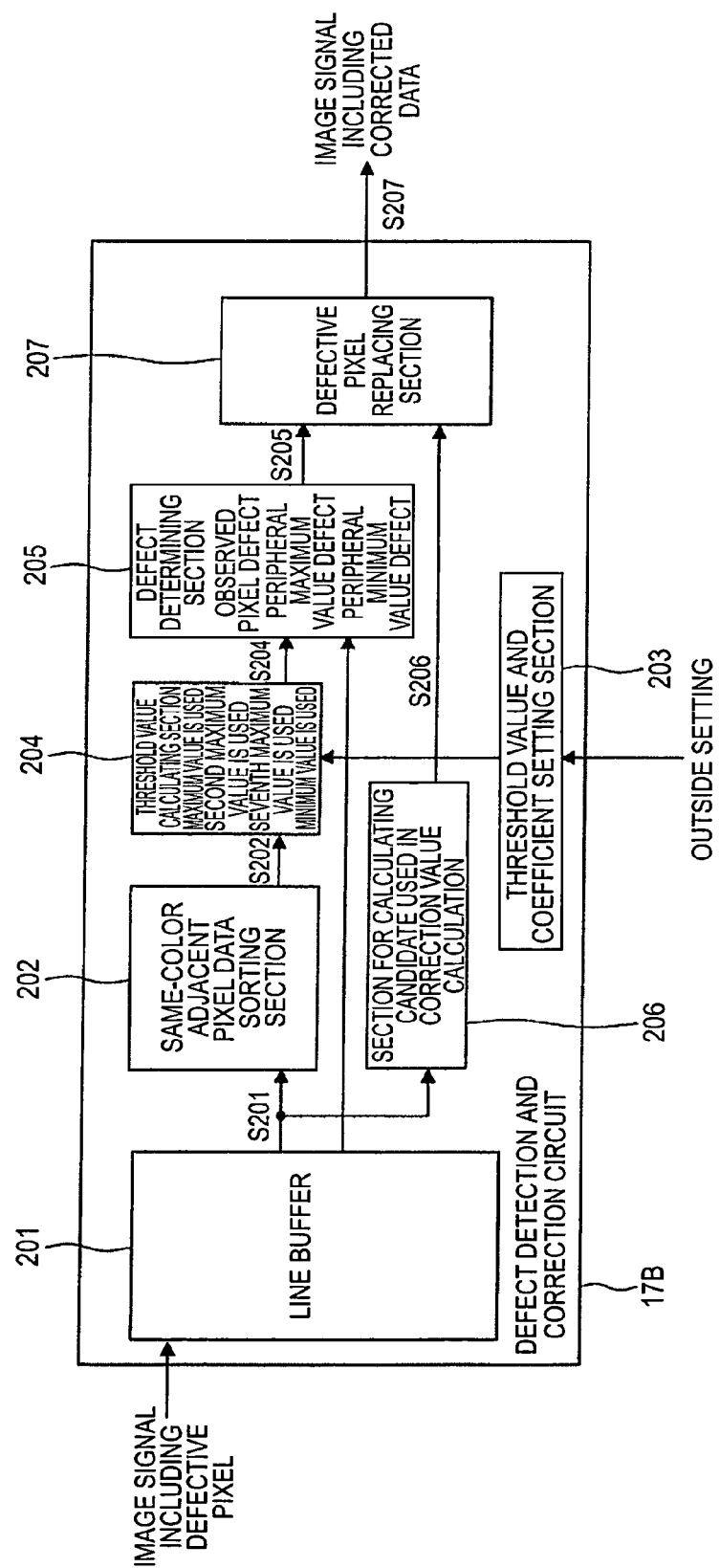

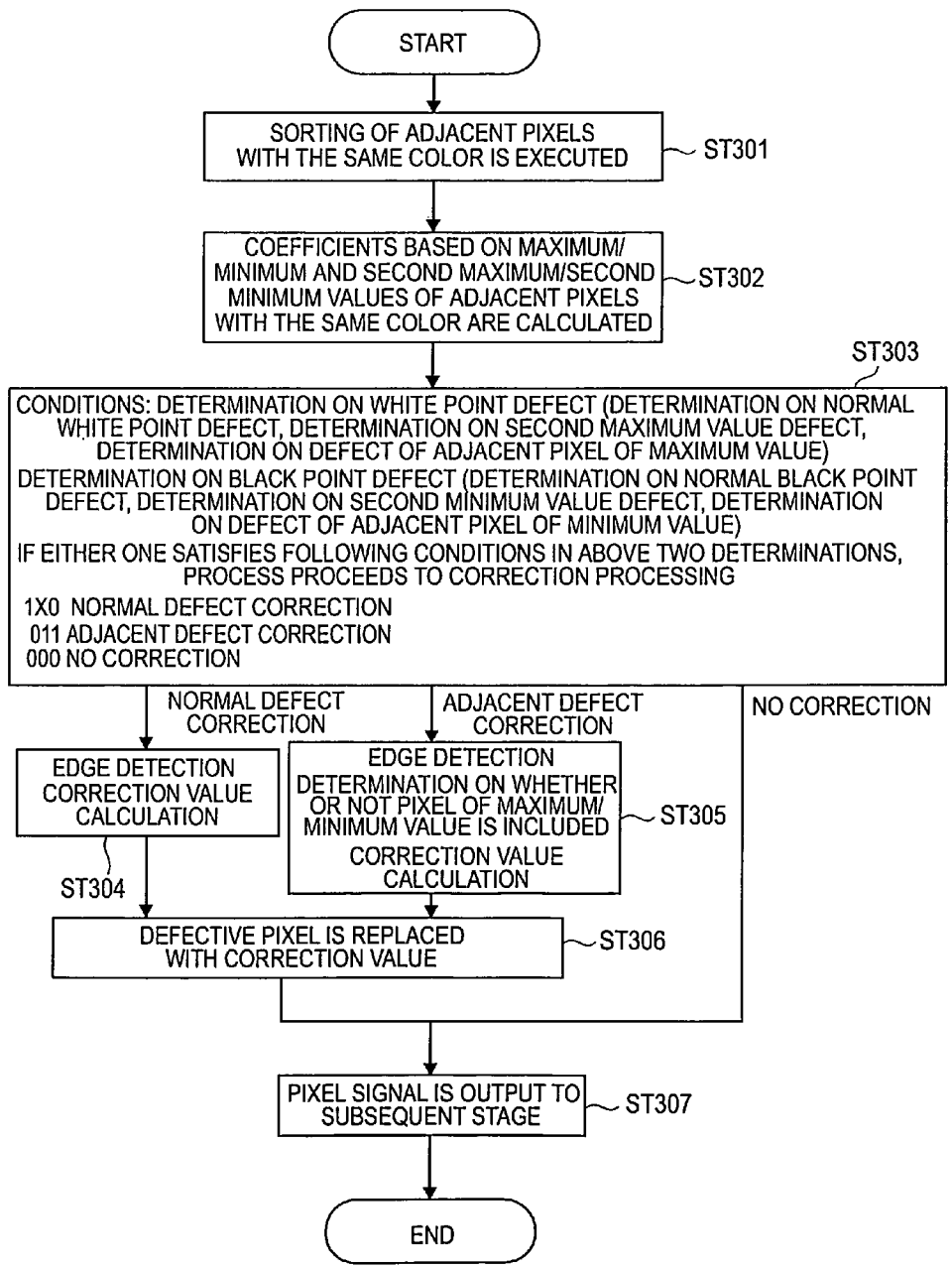

PIXEL DEFECT CORRECTION DEVICE, IMAGING APPARATUS, PIXEL DEFECT CORRECTION METHOD, AND PROGRAM

BACKGROUND OF THE INVENTION

1. Field of the Invention

The present invention relates to a pixel defect correction device with a function of detecting and compensating for a defective pixel in a solid state imaging device, such as a CCD or a CMOS sensor, an imaging apparatus, a pixel defect correction method, and a program.

2. Description of the Related Art

Generally, it is known that a defective pixel is generated in a solid state imaging device, such as a CCD (Charge Coupled Device) and a CMOS (Complementary Metal Oxide Semiconductor) sensor.

In such a solid state imaging device, it is known that a defective pixel, which outputs an abnormal imaging signal, is generated due to a local crystal defect of a semiconductor device and the like and this causes deterioration of the image quality.

Examples of the defective pixel include a black defective pixel and a white defective pixel.

That is, pixel defects of a solid state imaging device include a white defect, which is caused by addition of a predetermined amount of electric charges to the normal signal level, and a black defect, by which the signal level drops at a predetermined rate or a signal level around zero is output all the time.

Since these defects cause deterioration of the image quality at the time of image output, various kinds of defect detection and correction methods have been proposed (for example, see JP-A-2005-318383 and JP-A-2008-154276).

In general, defect correction for a pixel determined to be defective is realized by calculating a value, which replaces the value of the defective pixel, and replacing the value of the defective pixel with the calculated value.

The method of calculating a correction value may be realized by detecting the edge around the defective pixel and using the average value of two pixels, which are located in the edge direction with the defective pixel interposed therebetween, in order to adaptively correspond to an imaged image.

SUMMARY OF THE INVENTION

However, since the pixel value in the middle is not normal, there is a high possibility of degrading the precision of edge detection noticeably if the defective pixel itself is used for edge detection.

For example, in the methods disclosed in JP-A-2005-318383 and JP-A-2008-154276, even if not only a pixel whose defectiveness is to be determined but also the brightness value when a color carrier has been removed is used for edge detection, it is difficult to perform the edge detection precisely because a pixel of interest is not normal similar to that described above. For this reason, it is thought that the precision of defect detection also decreases.

In view of the above, it is desirable to provide a pixel defect correction device, an imaging apparatus, a pixel defect correction method, and a program capable of improving the edge detection precision and improving the defect detection precision.

According to an embodiment of the present invention, there is provided a pixel defect correction device including: a defect determining section that determines whether or not a pixel of interest of an image, in which a plurality of pixels each having a pixel value are arrayed in a two-dimensional manner, is a defect of the image; a gradient detecting section that detects a gradient or an edge in a processing region, which includes a plurality of pixels with the pixel of interest in the middle, on the basis of values of at least peripheral pixels around the pixel of interest which are included in the processing region; a correction value acquisition section that selects a pixel, which is used for acquisition of a correction value of the pixel of interest, according to the detected gradient or edge and acquires the correction value from a value of the selected pixel; and a defective pixel replacing section that replaces the value of the pixel of interest with the correction value when the pixel of interest is determined to be a defect of the image.

According to another embodiment of the present invention, there is provided an imaging apparatus including: a pixel section including an imaging device which images a subject image; and a pixel defect correction device that receives image data from the imaging device and performs pixel defect correction processing. In addition, the pixel defect correction device includes: a defect determining section that determines whether or not a pixel of interest of an image, in which a plurality of pixels each having a pixel value are arrayed in a two-dimensional manner, is a defect of the image; a gradient detecting section that detects a gradient or an edge in a processing region, which includes a plurality of pixels with the pixel of interest in the middle, on the basis of values of at least peripheral pixels around the pixel of interest which are included in the processing region; a correction value acquisition section that selects a pixel, which is used for acquisition of a correction value of the pixel of interest, according to the detected gradient or edge and acquires the correction value from a value of the selected pixel; and a defective pixel replacing section that replaces the value of the pixel of interest with the correction value when the pixel of interest is determined to be a defect of the image.

According to still another embodiment of the present invention, there is provided a pixel defect correction method including the steps of: determining whether or not a pixel of interest of an image, in which a plurality of pixels each having a pixel value are arrayed in a two-dimensional manner, is a defect of the image; detecting a gradient or an edge in a processing region, which includes a plurality of pixels with the pixel of interest in the middle, on the basis of values of at least peripheral pixels around the pixel of interest which are included in the processing region; selecting a pixel, which is used for acquisition of a correction value of the pixel of interest, according to the detected gradient or edge and acquiring the correction value from a value of the selected pixel; and replacing the value of the pixel of interest with the correction value when the pixel of interest is determined to be a defect of the image.

According to yet another embodiment of the present invention, there is provided a program causing a computer to execute pixel defect correction processing including: defect determination processing for determining whether or not a pixel of interest of an image, in which a plurality of pixels each having a pixel value are arrayed in a two-dimensional manner, is a defect of the image; direction detection processing for detecting a gradient or an edge in a processing region, which includes a plurality of pixels with the pixel of interest in the middle, on the basis of values of at least peripheral pixels around the pixel of interest which are included in the processing region; correction value acquisition processing for selecting a pixel, which is used for acquisition of a correction value of the pixel of interest, according to the detected gradient or edge and acquiring the correction value from a value of the selected pixel; and replacement processing for replacing the value of the pixel of interest with the correction value when the pixel of interest is determined to be a defect of the image.

According to the embodiments of the present invention, it is possible to improve the edge detection precision and as a result, to improve the defect detection precision.

BRIEF DESCRIPTION OF THE DRAWINGS

FIG. 5 is a view showing an example of the configuration of a defect detection and correction circuit according to the first embodiment;

FIG. 6 is a view showing an example of the processing region of 5 pixels×5 pixels on the Bayer arrangement;

FIG. 7 is a view showing an image of pseudo brightness value calculation processing when using the pseudo value as a brightness value;

FIG. 9 is a view showing an image of pseudo brightness calculation processing excluding a pixel with the same color as a pixel whose defectiveness is to be determined;

FIG. 12 is a view, showing an example of the pixel value in the case shown in FIGS. 11A to 11C;

FIG. 13 is a view showing the pseudo brightness calculated using a known method;

FIG. 14 is a view showing the pseudo brightness calculated using a method according to the first embodiment;

FIG. 18 is a view showing an example of the configuration of a defect detection and correction circuit according to a second embodiment of the present invention;

FIG. 23 is a view showing the flow chart of another defect detection and correction processing of the defect detection and correction circuit according to the second embodiment.

DESCRIPTION OF THE PREFERRED EMBODIMENTS

Hereinafter, a first embodiment of the present invention will be described with reference to the accompanying drawings.

In addition, the explanation will be given in following order.

1. First embodiment (example of acquiring the gradient or the edge on the basis of a pixel with a different color component from a pixel of interest)

2. Second embodiment (example of correcting a couplet pixel defect).

<1. First Embodiment>

[Example of the Entire Configuration of an Imaging Apparatus]

Figure 1:
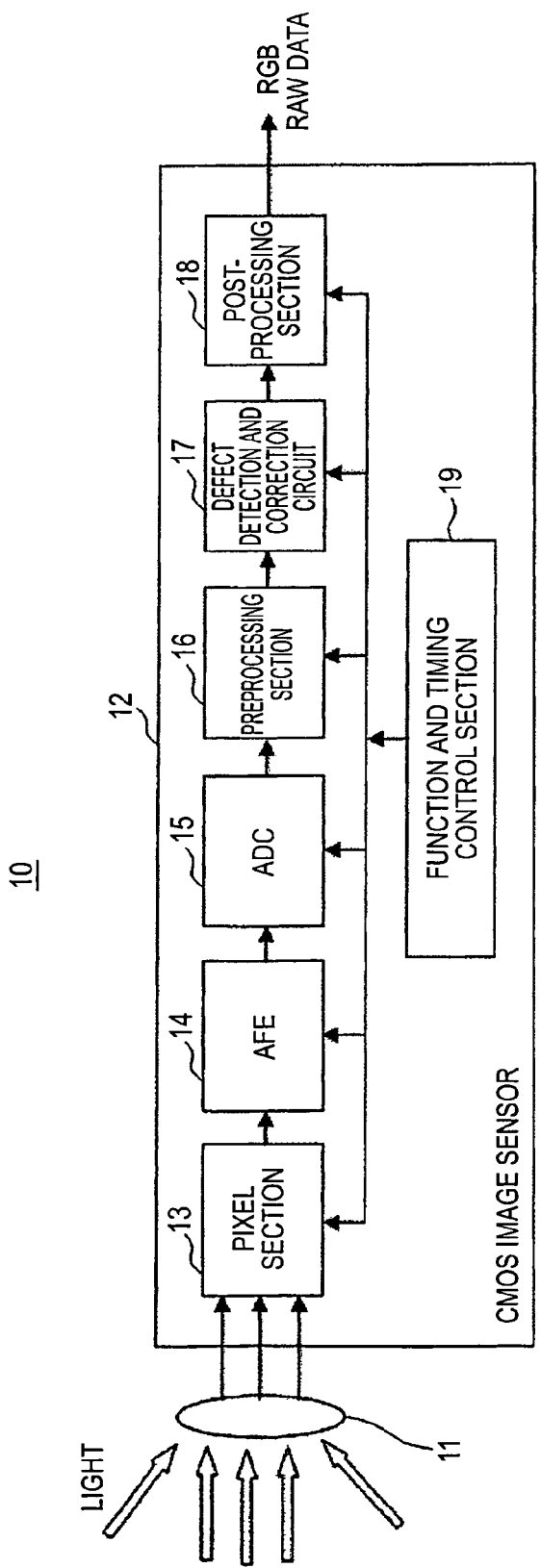
FIG. 1 is a block diagram showing an example of the configuration of an imaging apparatus to which a pixel defect correction device according to a first embodiment of the present invention is applied.

FIG. 1 is a block diagram showing an example of the configuration of an imaging apparatus to which a pixel defect correction device according to a first embodiment of the present invention is applied.

As shown in FIG. 1, an imaging apparatus 10 includes an optical system 11 and a CMOS image sensor 12 as a solid state imaging device.

The optical system 11 forms a subject image on the imaging surface of the imaging device 12.

The CMOS image sensor 12 includes a pixel section 13, an analog front end (AFE) 14, an analogue to digital converter (ADC) 15, and a preprocessing section 16.

The CMOS image sensor 12 includes a defect detection and correction circuit 17 which adopts a pixel defect correction method according to the first embodiment of the present invention, a post-processing section 18, and a function and timing control section 19.

The pixel section 13 is formed by a CMOS sensor, and a plurality of unit pixels are arrayed in a matrix.

Figure 2:
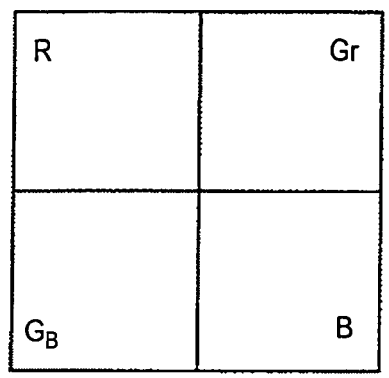
FIG. 2 is a view showing a Bayer arrangement as an example of the pixel arrangement.

For example, a Bayer arrangement shown in FIG. 2 is adopted as the pixel arrangement in the pixel section 13.

Figure 3:
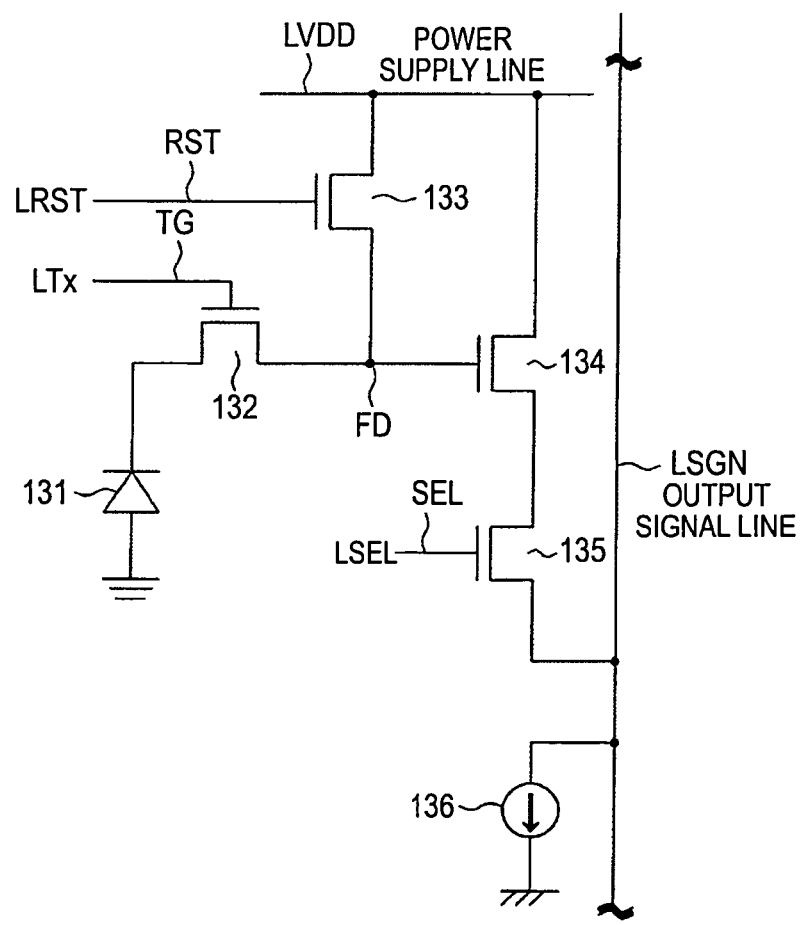
FIG. 3 is a circuit diagram showing an example of the configuration of a unit pixel in a pixel section in the first embodiment.

FIG. 3 is a circuit diagram showing an example of the configuration of a unit pixel in the pixel section 13 in the first embodiment.

FIG. 3 shows an example of a pixel of a CMOS image sensor formed by four transistors in the first embodiment.

Each pixel circuit 130 has a photoelectric conversion element 131 formed by a photodiode, for example, as shown in FIG. 3.

In addition, the pixel circuit 130 has four transistors of a transfer transistor 132, a reset transistor 133, an amplifying transistor 134, and a selection transistor 135, as active elements for the one photoelectric conversion element 131.

The photoelectric conversion element 131 performs photoelectric conversion of incident light into an electric charge (here, an electron) corresponding to the amount of light.

The transfer transistor 132 is connected between the photoelectric conversion element 131 and a floating diffusion FD, and a transmission signal TG which is a control signal is transmitted to a gate (transfer gate) of the transfer transistor 132 through a transfer control line LTx.

Accordingly, the transfer transistor 132 transfers to the floating diffusion FD an electron photoelectrically converted by the photoelectric conversion element 131.

The reset transistor 133 is connected between a power supply line LVDD and the floating diffusion FD, and a reset signal RST which is a control signal is transmitted to a gate of the reset transistor 133 through a reset control line LRST.

Accordingly, the reset transistor 133 resets the electric potential of the floating diffusion FD to the electric potential of the power supply line LVDD.

A gate of the amplifying transistor 134 is connected to the floating diffusion FD. The amplifying transistor 134 is connected to a signal line LSGN through the selection transistor 135 and forms a source follower together with a constant current source 136 provided outside the pixel section.

In addition, a selection signal SEL which is a control signal according to an address signal is transmitted to a gate of the selection transistor 135 through a selection control line LSEL. As a result, the selection transistor 135 is turned on.

If the selection transistor 135 is turned on, the amplifying transistor 134 amplifies the electric potential of the floating diffusion FD and outputs the voltage corresponding to the electric potential to the signal line LSGN. The voltage output from each pixel is output to the AFE 14, which is a read circuit, through the signal line LSGN.

These operations are simultaneously performed for pixels of one row since the gates of the transfer transistor 132, the reset transistor 133, and the selection transistor 135 are connected in units of a row, for example.

In the pixel section 13, a set of the reset control line LRST, the transfer control line LTx, and the selection control line LSEL which are wired to a pixel array portion are wired in units of a row of the pixel arrangement.

The reset control line LRST, the transfer control line LTx, and the selection control line LSEL are driven by a vertical scanning circuit (not shown).

In addition, the output signal line LSGN is connected to a read circuit including a correlated double sampling (CDS) circuit and the like.

In the first embodiment, the AFE 14 is made to have the CDS circuit function.

When a defective pixel signal exists in a digital image signal obtained by performing digital signal processing with the preprocessing section 16, the defect detection and correction circuit 17 corrects the defective pixel signal using a defective pixel detection and correction method, which will be described in detail later, and outputs the digital signal after correction to the post-processing section 18.

As shown below, the defect detection and correction circuit 17 in the first embodiment selects a pixel of interest from an image, in which a plurality of pixels are arrayed in a two-dimensional manner, and determines whether or not the selected pixel of interest is a defective pixel. When the selected pixel of interest is a defective pixel, the defect detection and correction circuit 17 corrects the value of the pixel of interest.

In addition, the defect detection and correction circuit 17 has a gradient detecting function which uses a color pixel other than a pixel with the same color as a pixel whose defectiveness is to be determined (selected pixel of interest).

The defect detection and correction circuit 17 has the gradient detecting function, which uses a color pixel other than a pixel with the same color as a pixel whose defectiveness is to be determined, and a change function for changing to the other directions when a direction including the maximum or minimum value of an adjacent defective pixel with the same color is selected as a defect correction direction by the gradient detecting function.

In addition, the defect detection and correction circuit 17 has a gradient detecting function of using the pixel whose defectiveness is to be determined after replacing it with the average value of eight peripheral pixels with the same color.

The defect detection and correction circuit 17 has a gradient detecting function of using the pixel whose defectiveness is to be determined after replacing it with the average value of six pixels excluding the maximum and minimum values around the same color.

Hereinafter, the outline of a function of the imaging apparatus 10 will be described, and then an example of the specific configuration of a pixel section and the specific configuration and a function of the defect detection and correction circuit 17 will be described.

[Outline of a Function of an Imaging Apparatus]

Incident light obtained from a subject is input to the pixel section 13 of the CMOS image sensor 12 through the optical system 11.

The incident light is converted into an electric signal by photoelectric conversion in the pixel section 13 and is then input to the AFE 14. The input electric signal is output as an electric signal after correlated double sampling and auto gain control (AGC) are performed by the AFE 14.

The electric signal output from the AFE 14 is output as a digital signal after A/D conversion processing is performed by the ADC 15.

Various kinds of digital processing on the digital signal are performed by the preprocessing section 16, and the digital signal is output to the defect detection and correction circuit 17.

When a defective pixel signal exists in the digital signal, the defect detection and correction circuit 17 corrects the defective pixel signal using the defective pixel detection and correction method, which will be described later, and outputs the digital signal after correction.

The digital signal is input to the post-processing section 18 and is output after various kinds of digital processing are performed. The digital signal becomes an output signal of the CMOS image sensor 12.

In addition, the function and timing control section 19 controls the operation of each section of the CMOS image sensor 12.

[Example of the Configuration of a Pixel Section]

Figure 4:
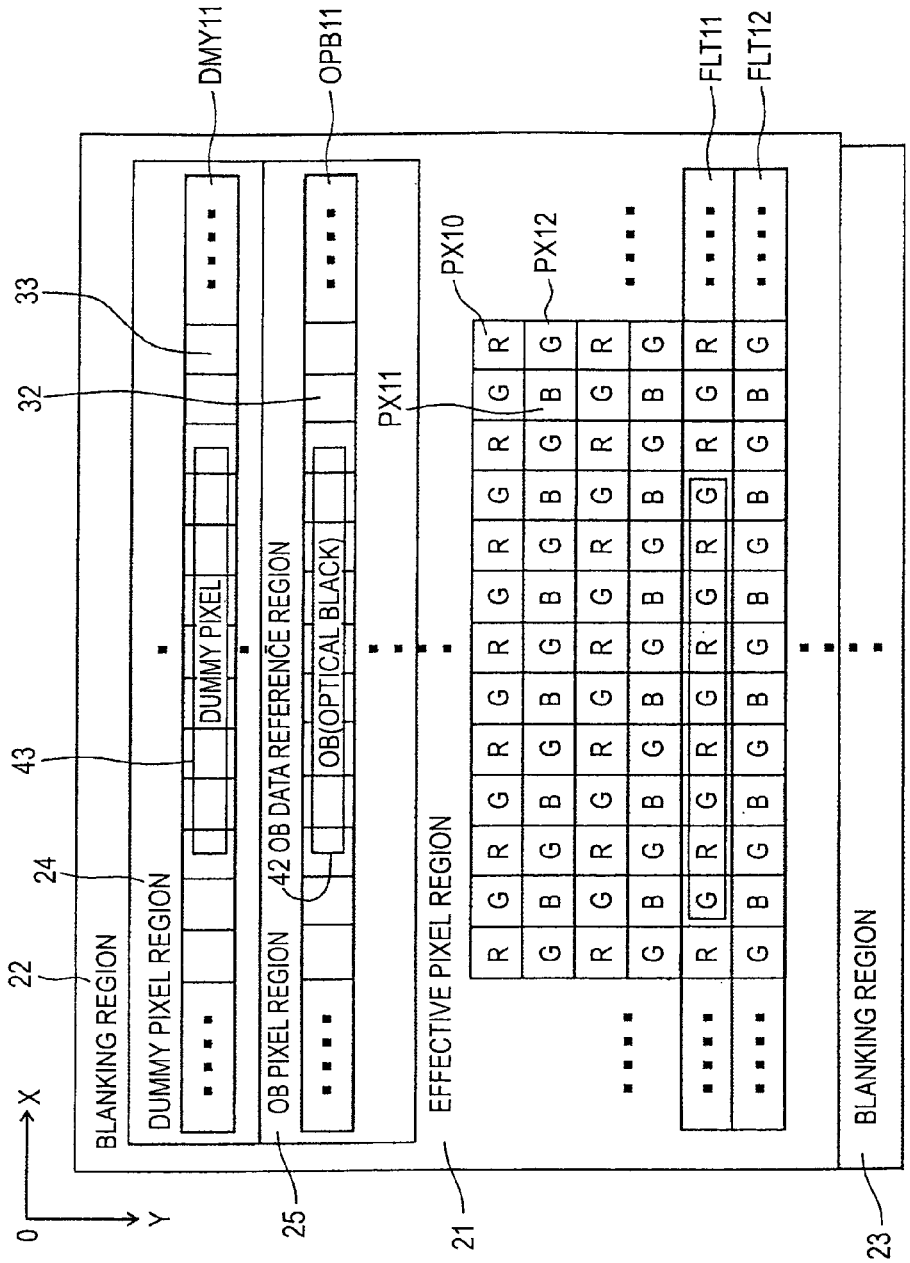
FIG. 4 is a view showing an example of the configuration of a pixel section shown in FIG. 1.

FIG. 4 is a view showing an example of the configuration of the pixel section 13 shown in FIG. 1.

The pixel section 13 has an effective pixel region 21, which has a plurality of effective pixels 31 each of which has a filter corresponding to one of RGB colors, and blanking regions 22 and 23, as shown in FIG. 4.

The blanking region 22 has an OB pixel region 25, which has a plurality of optical black (OB) pixels 32, and a dummy pixel region 24, which has a plurality of dummy pixels 33.

The effective pixel region 21 includes a pixel PX10 of an R (red) transmission filter, a pixel PX11 of a B (blue) transmission filter, and a pixel PX12 of a G (green) transmission filter as the effective pixels 31, and these pixels are arrayed in a matrix.

The effective pixel region 21 has a first filter row FLT11 in which the pixel PX10 of the R transmission filter and the pixel PX12 of the G transmission filter are alternately repeated in a horizontal direction (X direction).

The effective pixel region 21 has a second filter row FLT12 in which the pixel PX12 of the G transmission filter and the pixel PX11 of the B transmission filter are alternately repeated in the horizontal direction.

In the effective pixel region 21, the first and second filter rows FLT11 and FLT12 are alternately arrayed repeatedly in a vertical direction (Y direction).

The pixel PX12 of the G transmission filter of the first filter row FLT11 and the pixel PX12 of the G transmission filter of the second filter row FLT12 are arrayed so as not to overlap each other in the vertical direction. Generally, this filter arrangement is used as a Bayer arrangement.

Moreover, similar to the effective pixel 31 which has a filter of RGB, a defective pixel may exist in an OB row OPB11 in which the OB pixel 32 is in the shaded state.

There is no defect in a dummy pixel row DMY11.

These pixel outputs are alternately output from a plurality of dummy pixel rows DMY11, a plurality of OB rows OPB11, and the first and second filter rows FLT11 and FLT12.

In the first embodiment, defect detection and correction processing is performed in the plurality of OB rows OPB11 and the plurality of rows of effective pixel regions 21.

[Example of the Configuration of a Defect Detection and Correction Circuit]

FIG. 5 is a view showing an example of the configuration of the defect detection and correction circuit 17 according to the first embodiment.

FIG. 6 is a view showing an example of the processing region (5 pixels×5 pixels) on the Bayer arrangement.

FIG. 7 is a view showing an image of pseudo brightness value calculation processing when using the pseudo value as a brightness value.

FIGS. 8A to 8D are views showing the brightness position referred to in gradient calculation.

Figure 9:
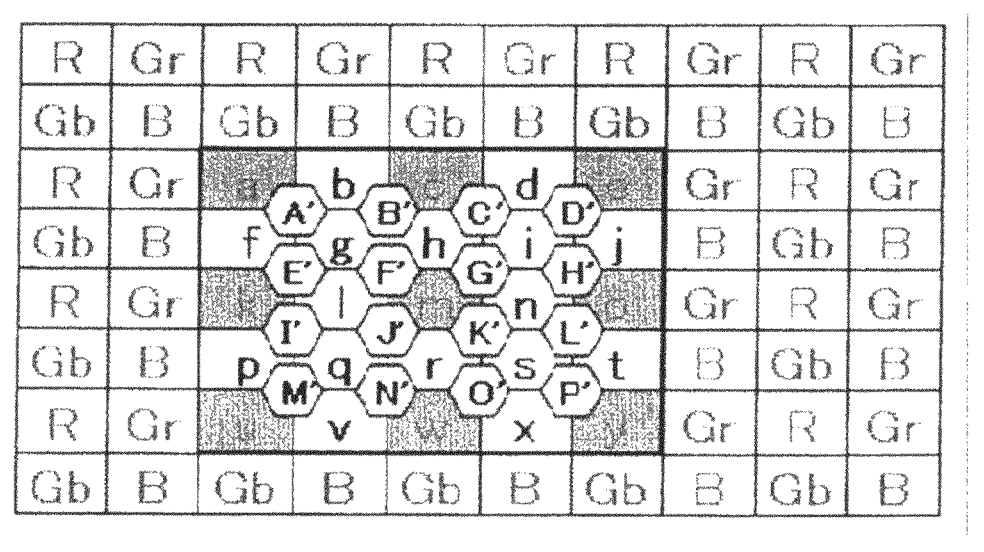

FIG. 9 is a view showing an image of pseudo brightness calculation processing excluding a pixel with the same color as a pixel whose defectiveness is to be determined.

As shown in FIG. 5, the defect detection and correction circuit 17 includes a line buffer 171, a threshold value and coefficient setting section 172, a defect determination threshold value calculating section 173, a gradient calculating section (gradient detecting section) 174, a defect determining section 175, a correction value calculating section (correction value acquisition section) 176, and a defective pixel replacing section 177.

In addition, although an example of gradient detection is described in the first embodiment, the present invention may be similarly applied to the case of edge detection.

The line buffer 171 is formed by a memory for four lines and generates a processing region PRCA of (5 pixels in the horizontal direction)×(5 pixels in the vertical direction), which has a pixel of interest (pixel whose defectiveness is to be determined DJPX) in the middle, from a Bayer arrangement signal SIM output from the pixel section 13, as shown in FIG. 6.

The line buffer 171 outputs a signal S171, which includes the information regarding the generated processing region PRCA, to the defect determination threshold value calculating section 173 and the gradient calculating section 174.

Here, the horizontal direction is an X direction on the coordinate system shown in FIG. 6, and the vertical direction is a Y direction.

In addition, although the processing region is a region of 5 pixels×5 pixels, this is just an example. For example, the present invention may also be applied to a region larger than the region of 5 pixels×5 pixels.

The defect determination threshold value calculating section 173 multiplies the defect determination reference value DJRF, which is output from the line buffer 171 provided at the preceding stage, by the threshold value and a coefficient set by the threshold value and coefficient setting section 172.

Although the defect determination reference value DJRF is not particularly limited, the maximum value, minimum value, or average value of adjacent pixels with the same color or different colors, the N-th largest value or the N-th smallest value (N: 2 to 4), and the like correspond to the defect determination reference value DJRF. Dispersion and correlation may be applied in combination.

The defect determination threshold value calculating section 173 outputs the calculation result to the defect determining section 175 as a signal S173.

The defect determining section 175 compares the calculation value using the pixel whose defectiveness is to be determined DJPX or a pixel whose defectiveness is to be determined with the calculation result of the defect determination threshold value calculating section as a threshold value, and determines whether or not it is a defective pixel.

The defect determining section 175 outputs the determination result, which indicates whether or not the pixel whose defectiveness is to be determined (pixel of interest) is a defective pixel, to the defective pixel replacing section 177 as a signal S175.

The gradient calculating section 174 calculates the gradient of the processing region of 5×5 pixels with the pixel whose defectiveness is to be determined in the middle. Generally, the gradient calculating section 174 calculates the gradient after calculating the brightness value.

Here, a pseudo value is used as the brightness value for the sake of simplicity. FIG. 7 shows an image of pseudo brightness.

By comparing FIG. 7 with FIG. 6, it can be seen that "a, c, e k, m, o u, w, y" is R, "b, d, l, n, v, x" is Gr, and "f, h, j, p, r, t" is Gb, and "g, i, q, s" is B.

The positions of the pseudo brightness are "A, B, C, D, E, F, G, H, I, J, K, L, M, N, O, P" shown at the positions surrounded by four pixels. The pseudo brightness is calculated from the sum of four surrounding pixels.

For example, A=(a+b+f+g), B=(b+c+g+h), . . . , P=(s+t+x+y).

These may be average values, or R, Gr, B, and Gb may be multiplied by a weighting coefficient.

After the pseudo brightness calculation, the gradient is calculated for every direction and a direction corresponding to the gentlest gradient is detected as shown in FIGS. 8A to 8D. The gradient calculation may be performed through a difference operation or a differential operation, or may be replaced with edge detection. In this case, it may be performed through a secondary difference operation or a secondary differential operation.

FIGS. 8A to 8D show four sets of three continuous brightness values, which are aligned in a straight line, for every direction.

Figure 8A:
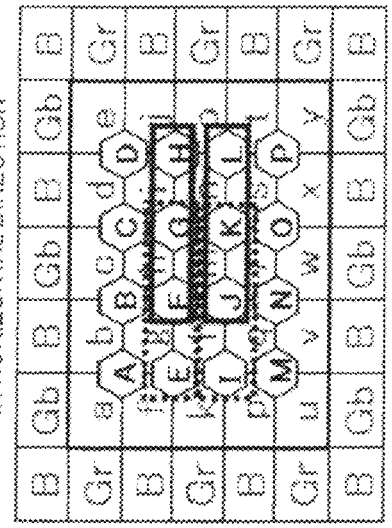
FIGS. 8A to 8D are views showing the brightness position referred to in gradient calculation.
Figure 8B:
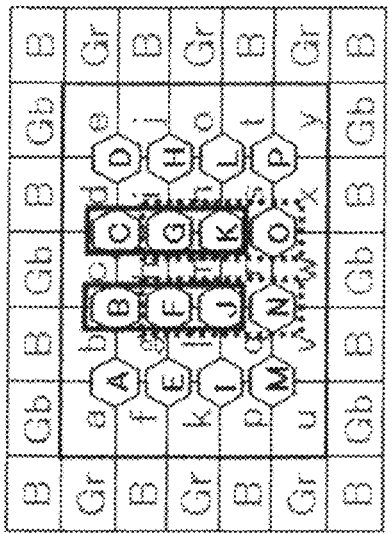
Figure 8C:
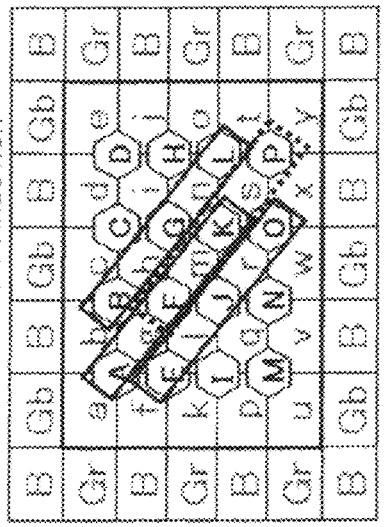
Figure 8D:
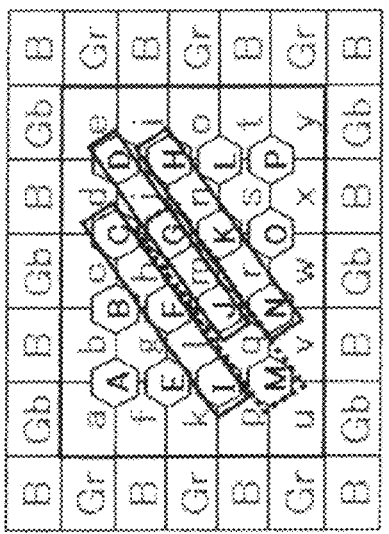

FIG. 8A shows an example of calculating the gradient in the vertical direction, FIG. 8B shows an example of calculating the gradient in the horizontal direction, FIG. 8C shows an example of calculating the gradient in the upper right direction, and FIG. 8D shows an example of calculating the gradient in the upper left direction.

That is, the gradient calculating section 184 acquires the gradients in four directions of the vertical direction, the horizontal direction, the direction of inclination of 45°, and the direction of inclination of 135°.

An operation example of secondary differential is shown below.

Assuming that the three brightness values aligned in the straight line are X, Y, and Z, $X-2Y+Z$ is set.

Four secondary differential values are calculated for every direction, the sums of the absolute values are calculated and compared for every direction, and the direction corresponding to the minimum value is set as the gentlest gradient direction.

In the first embodiment, the following operation is used for the pseudo brightness calculation described above.

FIG. 9 shows an image of the pseudo brightness operation used in the first embodiment.

The positions of pseudo brightness are "A', B', C', D', E', F', G', H', I', J', K', L', M', N', O', P'" shown at the positions surrounded by four pixels.

In FIG. 9, the pseudo brightness is calculated from the sum of three pixels of the four surrounding pixels excluding a pixel with the same color as a defective pixel.

For example, A=(b+f+g), B=(b+g+h), . . . , P=(s+t+x).

These may be average values, or R, Gr, B, and Gb may be multiplied by a weighting coefficient in the same manner as described above. The gradient calculation is the same as that described above.

In addition, FIG. 9 shows an example of the pseudo brightness when a pixel of interest is red (R) or blue (B) of the Bayer arrangement like FIG. 6. When a pixel of interest is green (Gr or Gb) of the Bayer arrangement, it is preferable to calculate the pseudo brightness from three pixels excluding a pixel with the same color as a defective pixel, for example, independently for every group of Gr or Gb.

The gradient calculating section 174 selects a direction of the gentlest gradient from the calculated gradients for a plurality of directions. The gradient calculating section 174 outputs the gradient calculation result, which indicates the selected direction of the gentlest gradient, to the correction value calculating section 176 as a signal S174.

From the direction of the gentlest gradient selected by the gradient calculating section 174 provided at the preceding stage, the correction value calculating section 176 decides on a pixel to be used to calculate the correction value and performs an operation.

When a symbol shown in FIG. 7 is used, (c+w)/2 is set as a correction value for a defective pixel m if the gentlest inclination is a longitudinal direction, (k+o)/2 is set as a correction value for a defective pixel m if the gentlest inclination is a horizontal direction, (e+u)/2 is set as a correction value for a defective pixel m if the gentlest inclination is an upper right direction, and (a+y)/2 is set as a correction value for a defective pixel m if the gentlest inclination is an upper left direction.

That is, for a pixel whose defectiveness is to be determined (pixel of interest), the correction value calculating section 176 selects a plurality of pixels with the same color located in the direction of the selected gradient and calculates the average value as a correction value.

The correction value calculating section 176 outputs the calculated correction value to the defective pixel replacing section 177 as a signal S176.

When the defect determining section 175 determines that the pixel whose defectiveness is to be determined (pixel of interest) is a defective pixel, the defective pixel replacing section 177 replaces the defective pixel value with the defective pixel correction value calculated by the correction value calculating section 176.

The defective pixel replacing section 177 outputs an image signal including the correction data as a signal S17.

[Explanation Regarding Defect Detection and Correction Processing]

Figure 10:
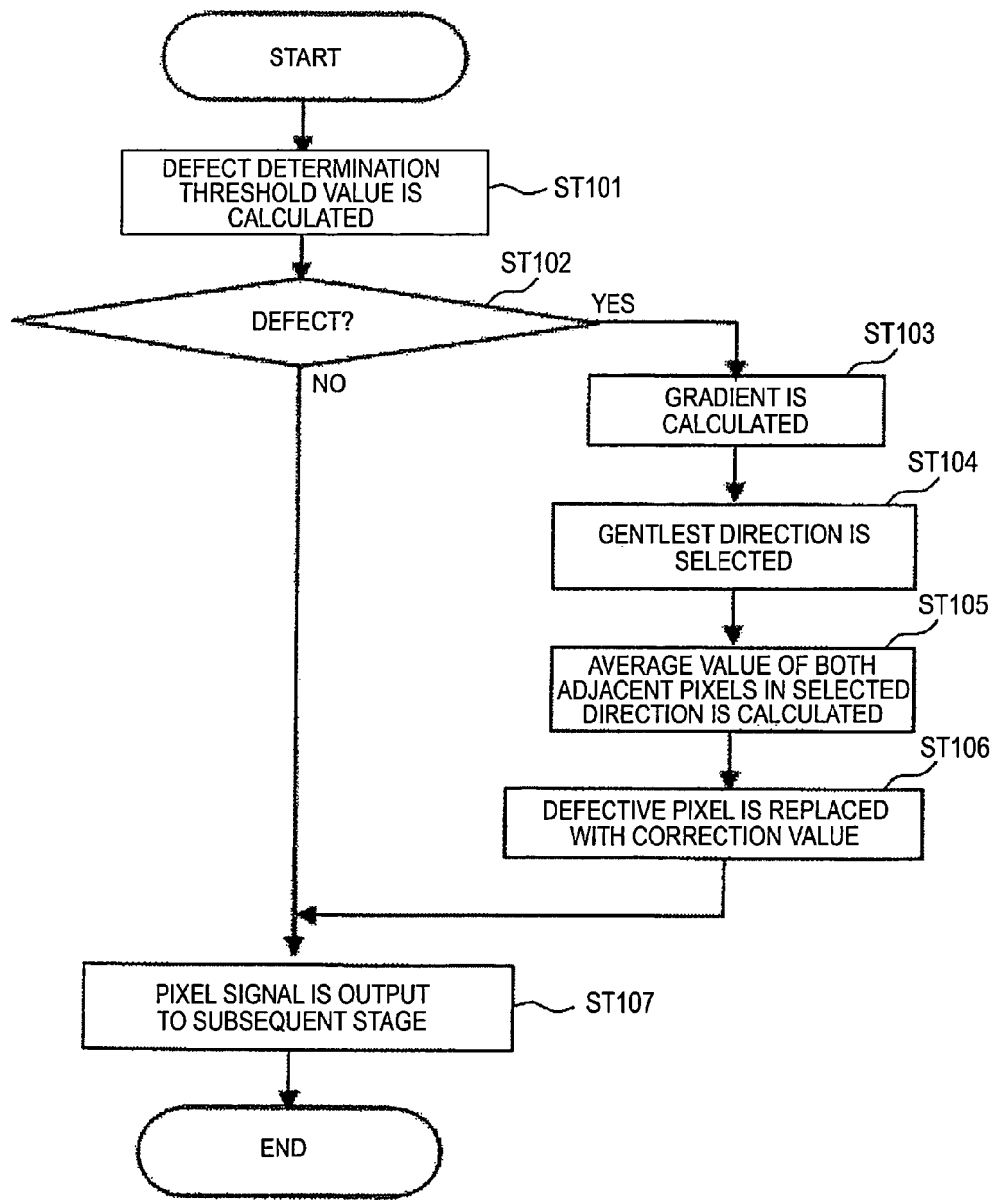
FIG. 10 is a view showing the flow chart of defect detection and correction processing of the defect detection and correction circuit according to the first embodiment.

FIG. 10 is a view showing the flow chart of defect detection and correction processing of the defect detection and correction circuit according to the first embodiment. The processing in FIG. 10 is repeatedly executed for all pixels which form an image.

[Step ST101]

First, in step ST101, the line buffer 171 generates the processing region PRCA of (5 pixels in the horizontal direction)×(5 pixels in the vertical direction), which has a pixel of interest (pixel whose defectiveness is to be determined DJPX) in the middle, from the Bayer arrangement signal SIM output from the pixel section 13.

The signal S171 including the information regarding the processing region PRCA generated by the line buffer 171 is output to the defect determination threshold value calculating section 173 and the gradient calculating section 174.

In the defect determination threshold value calculating section 173, a threshold value, which can be set from the outside, and the coefficient and the defect determination reference value are calculated and the threshold value for determining whether or not the pixel whose defectiveness is to be determined is a defective pixel is calculated.

The calculation result is output to the defect determining section 175 as the signal S173.

[Step ST102]

In step ST102, the defect determining section 175 compares the threshold value calculated by the defect determination threshold value calculating section 173 with the value of the pixel whose defectiveness is to be determined, and determines whether or not the pixel whose defectiveness is to be determined is a defective pixel.

The determination result is output to the defective pixel replacing section 177.

Here, when it is determined that the pixel whose defectiveness is to be determined is a defective pixel, the process proceeds to step ST103.

[Step ST103]

In step ST103, the gradient calculating section 174 calculates the pseudo brightness when pixels with the same color as a defective pixel are excluded from 5×5 pixels having the defective pixel in the middle, and calculates the gradient in all directions of longitudinal direction, horizontal direction, upper right direction, and upper left direction.

[Step ST104]

In step ST104, the gradient calculating section 174 selects the gentlest direction from the gradients of all directions calculated in step ST103. Specifically, a direction in which the edge intensity output value is the minimum is selected.

The result is output to the correction value calculating section 176.

[Step ST105]

In step ST105, the correction value calculating section 176 calculates the average value of two pixels with the same color, which are adjacent to each other with the pixel whose defectiveness is to be determined interposed therebetween, in the direction selected by the gradient calculating section 174.

The calculation result is output to the defective pixel replacing section 177.

[Step ST106]

In step ST106, the defective pixel replacing section 177 replaces the pixel value of the pixel whose defectiveness is to be determined, which has been determined to be defective, with the correction value calculated by the correction value calculating section 176.

[Step ST107]

In step ST107, an image signal including the correction data replaced with the correction value after processing in step ST106 is output as the signal S17 to the subsequent processing system.

Or in step ST107, the image signal S17 which does not include the correction data is output to the subsequent processing system when it is determined that the pixel whose defectiveness is to be determined is not a defective pixel in step ST102. That is, the pixel whose defectiveness is to be determined DJPX is output as it is.

Figure 11A:
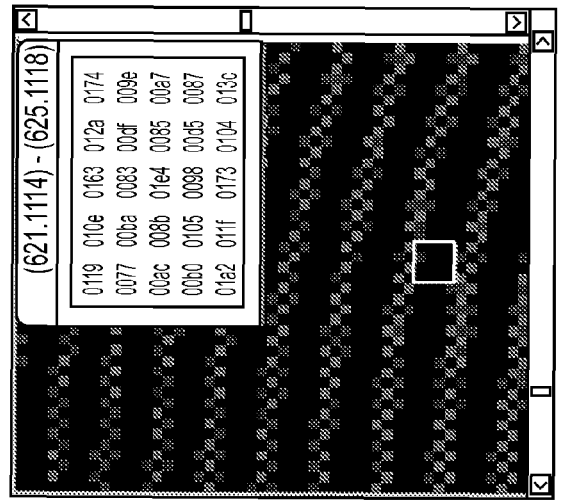
FIGS. 11A to 11C are views showing actual processing images.
Figure 11B:
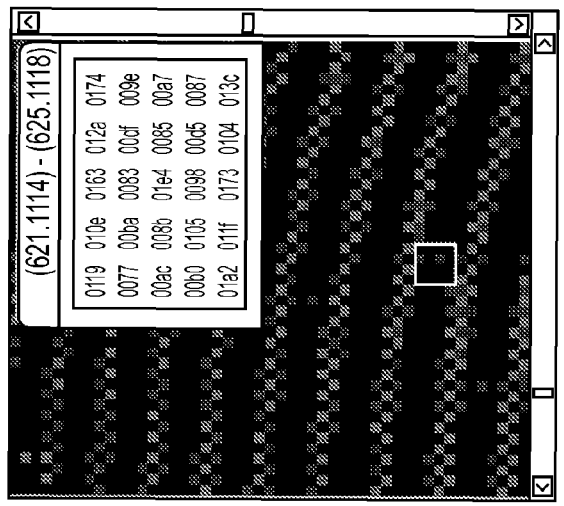
Figure 11C:
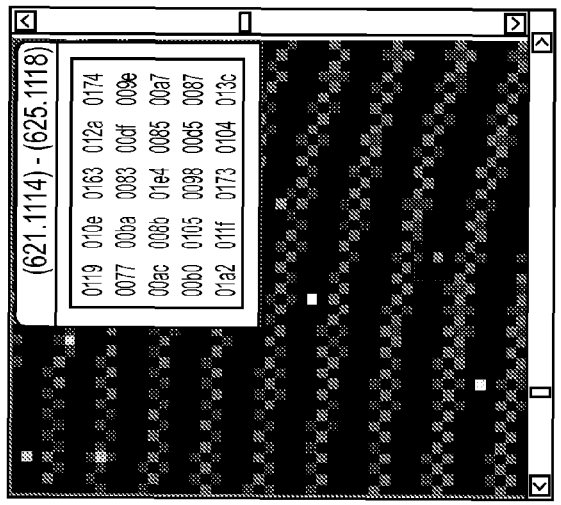

FIGS. 11A to 11C are views showing actual processing images.

FIG. 11A shows an original image, FIG. 11B shows an image whose defect has been corrected using a known method, and FIG. 11C shows an image whose defect has been corrected using the method according to the first embodiment.

FIG. 12 is a view showing an example of the pixel value in the case shown in FIGS. 11A to 11C.

FIG. 13 is a view showing the pseudo brightness calculated using the known method.

FIG. 14 is a view showing the pseudo brightness calculated using the method according to the first embodiment.

Gradient calculation using the known method is shown below.

Longitudinal direction:

$|942-2*940+1036|+|1007-2*971+982|+|940-2*1036+1071|+|971-2*982+996|=209$

Horizontal direction:

$|616-2*940+971|+|748-2*1036+982|+|940-2*971+681|+|1036-2*982+648|=1236$

Upper right direction:

$|1051-2*971+1036|+|971-2*1036+1142|+|1007-2*940+748|+|681-2*982+1071|=523$

Upper left direction:

$|856-2*940+982|+|940-2*982+924|+|942-2*971+648|+|616-2*1036+996|=954$

Accordingly, the longitudinal direction which is the minimum is determined to be the gentlest gradient.

Gradient calculation in the first embodiment is shown below

Longitudinal direction:

$|587-2*456+552|+|652-2*487+498|+|456-2*552+700|+|487-2*498+625|=571$

Horizontal direction:

$|444-2*456+487|+|576-2*552+498|+|456-2*487+514|+|552-2*498+481|=90$

Upper right direction:

$|679-2*487+552|+|487-2*552+724|+|652-2*456+576|+|514-2*498+700|=898$

Upper left direction:

$|575-2*456+498|+|456-2*498+608|+|587-2*487+481|+|444-2*552+625|=358$

Accordingly, the horizontal direction which is the minimum is determined to be the gentlest gradient.

Also from FIG. 11A, it is clear that selecting the horizontal direction as a correction direction is preferable.

FIG. 11A shows an image of a horizontal stripe pattern.

As a modification, the value of the pixel whose defectiveness is to be determined may be replaced with the average value of eight peripheral pixels with the same color.

Figure 15:
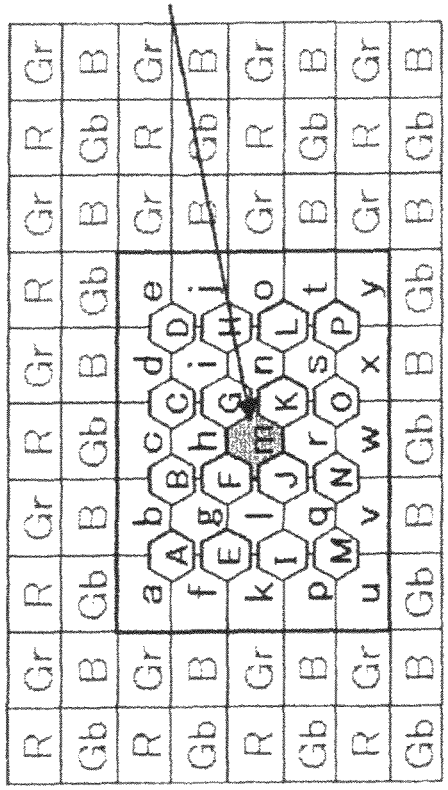
FIG. 15 is a view showing an image when the pseudo brightness is calculated by replacing a pixel whose defectiveness is to be determined with the average value of eight peripheral pixels with the same color.

FIG. 15 is a view showing an image when the pseudo brightness is calculated by replacing a pixel whose defectiveness is to be determined with the average value of eight peripheral pixels with the same color.

In this case, it becomes $A=(a+b+f+g)$, $B=(b+c+g+h)$, ..., $P=(s+t+x+y)$.

Alternatively, the value of the pixel whose defectiveness is to be determined may be replaced with the average value of six pixels among eight peripheral pixels with the same color excluding the maximum and minimum values or may be replaced with the average value of four pixels among eight peripheral pixels with the same color excluding two pixels from the largest pixel value and two pixels from the smallest pixel value.

Undoubtedly, the value of the pixel whose defectiveness is to be determined may be replaced with the average value of two pixels in the middle, or the pixel whose defectiveness is to be determined may be replaced with a pixel with an N-th largest pixel value.

As described above, according to the first embodiment, the following effects can be acquired.

That is, according to the first embodiment, the pixel value determined to be defective is not used when calculating the gradient. Accordingly, precision of gradient recognition is improved. As a result, since there is no sense of discomfort for the user viewing up to a detailed portion of an output image, the quality of the entire image is improved. In particular, this is very effective for an input image with high resolution.

Moreover, since it is not necessary to add a special complicated operation, the circuit size and the power consumption are not largely different from those in the known technique.

<Second Embodiment>
[Kind of Pixel Defect]

The first embodiment is an example of appropriately correcting the value of a pixel of interest when the pixel of interest has a defect. On the other hand, the second embodiment is an example of appropriately correcting the value of a pixel of interest when there are defects in the pixel of interest and a pixel with the same color around the pixel of interest, that is, when there is a couplet pixel defect.

Figure 16A:
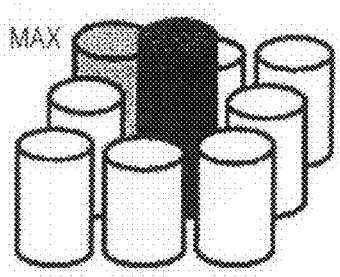
FIGS. 16A and 16B are explanatory views of an example of a plurality of pixel values of the processing region when only a pixel of interest is defective.
Figure 16B:
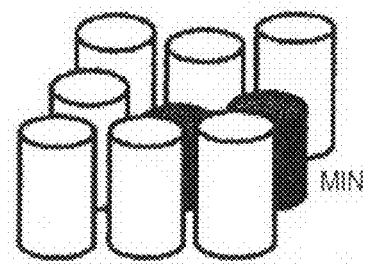

FIGS. 16A and 16B are explanatory views when there is a defect in a pixel of interest. FIG. 16A shows an example of a white defect, and FIG. 16B shows an example of a black defect.

In FIGS. 16A and 16B, nine columns arrayed in three rows×three columns correspond to nine adjacent pixels with the same color, and the height corresponds to the pixel value of each pixel. That is, the middle column is a pixel of interest, and the eight columns therearound correspond to adjacent pixels with the same color around the pixel of interest.

In addition, when only a pixel of interest has a white defect, the pixel value of the pixel of interest becomes a large value as shown in FIG. 16A. In this case, the pixel value of the pixel of interest projects out over the pixel value of a peripheral pixel with the same color (in FIG. 16A, the pixel value of an upper left pixel).

In addition, when only a pixel of interest has a black defect, the pixel value of the pixel of interest becomes a small value as shown in FIG. 16B. In this case, the pixel value of the pixel of interest is lower than the minimum pixel value of peripheral pixels with the same color (in FIG. 16B, the pixel value of a middle pixel in the right column).

Moreover, in the pixel defect correction method of the first embodiment, when only a pixel of interest has a defect as described above, the pixel value of the pixel of interest can be appropriately corrected on the basis of the pixel value of a peripheral pixel with no defect.

Figure 17A:
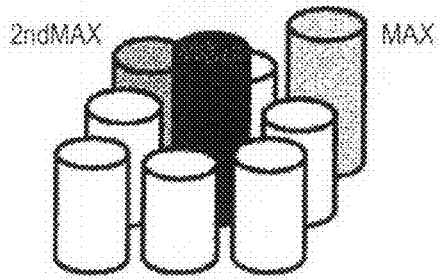
FIGS. 17A and 17B are explanatory views of an example of a plurality of pixel values of the processing region when there are adjacent defects in a pixel of interest and a peripheral pixel.
Figure 17B:
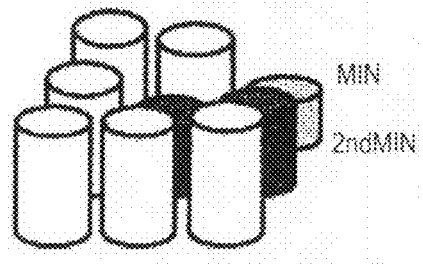

FIGS. 17A and 17B are explanatory views when there are defects in a pixel of interest and a peripheral pixel. FIG. 17A shows an example of a white defect, and FIG. 17B shows an example of a black defect.

In FIGS. 17A and 17B, nine columns correspond to nine adjacent pixels with the same color, similar to FIGS. 16A and 16B.

In addition, when there is a white defect in a pixel of interest and an upper right peripheral pixel, the pixel value of the pixel of interest and the pixel value of the upper right peripheral pixel become large values as shown in FIG. 17A. In this case, the pixel value of the pixel of interest and the pixel value of the upper right peripheral pixel project out over the pixel values of the other peripheral pixels with the same color.

In addition, when there is a black defect in a pixel of interest and an upper right peripheral pixel, the pixel value of the pixel of interest and the pixel value of the upper right peripheral pixel become large values as shown in FIG. 17B. In this case, the pixel value of the pixel of interest and the pixel value of the upper right peripheral pixel are lower than the pixel values of the other peripheral pixels with the same color.

Thus, when a couplet defect occurs, the pixel value of the pixel of interest may not be appropriately corrected in the pixel defect correction method of the first embodiment.

For example, when the direction of the edge selected on the basis of the pseudo brightness value is an upper right direction in FIGS. 17A and 17B, an upper right peripheral pixel and a lower left peripheral pixel are selected as pixels for calculating the correction value.

Moreover, the average value of the pixel value of the upper right peripheral pixel which is defective and the pixel value of the lower left peripheral pixel which is not defective is calculated as the correction value of the pixel of interest.

In this case, the correction value of the pixel of interest, which is considered to be defective, is influenced by the pixel value of a peripheral pixel with a defect.

That is, even if the pixel value of a pixel of interest is corrected by the pixel defect correction method of the first embodiment, the pixel value of the pixel of interest replaced with the correction value is not appropriate because the pixel of interest is influenced by the defect of a peripheral pixel.

[Example of the Configuration of a Defect Detection and Correction Circuit]

FIG. 18 is a view showing an example of the configuration of a defect detection and correction circuit 17B according to the second embodiment of the present invention.

The defect detection and correction circuit 17B shown in FIG. 18 includes a line buffer 201, a same-color adjacent pixel data sorting section 202, a threshold value and coefficient setting section 203, a threshold value calculating section 204, a defect determining section 205, a section for calculating a candidate used in correction value calculation 206, and a defective pixel replacing section 207.

In addition, although an example of edge detection is described in the second embodiment, the present invention may be similarly applied to the case of gradient detection.

The configuration of an imaging apparatus according to the second embodiment except for those shown in FIG. 18 is the same as the configuration of the imaging apparatus according to the first embodiment. Therefore, a constituent component having the same function as in the first embodiment is denoted by the same reference numeral as in the first embodiment, and an explanation thereof will be omitted.

The line buffer 201 is formed by a memory for five lines of an image since a processing region of 5 rows×5 columns is an object to be calculated.

The line buffer 201 generates a processing region PRCA of (5 pixels in the horizontal direction)×(5 pixels in the vertical direction), which has a pixel of interest (pixel whose defectiveness is to be determined DJPX) in the middle, from the Bayer arrangement signal SIM output from the pixel section 13, as shown in FIG. 6.

The line buffer 201 outputs a signal S201, which includes the information regarding the generated processing region PRCA, to the same-color adjacent pixel data sorting section 202, the defect determining section 205, and the section for calculating a candidate used in correction value calculation 206.

Here, the horizontal direction is an X direction on the coordinate system shown in FIG. 6, and the vertical direction is a Y direction.

In addition, although the processing region is a region of 5 pixels×5 pixels, this is just an example. For example, the present invention may also be applied to a region larger than the region of 5 pixels×5 pixels.

The same-color adjacent pixel data sorting section 202 selects a pixel of interest and peripheral pixels with the same color, which are included in the processing region, and sorts them in order of pixel values.

For example, in the processing region (5 pixels×5 pixels) shown in FIG. 6, eight peripheral pixels are selected and are sorted in order of pixel values when the pixel of interest is red (R) or blue (B). Moreover, when the pixel of interest is green (Gr, Gb), eight peripheral pixels are selected and are sorted in order of pixel values, for example, independently for every group of Gr or Gb.

Then, the same-color adjacent pixel data sorting section 202 outputs a signal S202 including the sorting result to the threshold value calculating section 204.

The threshold value calculating section 204 calculates the threshold value for determining a defective pixel in the processing region.

For example, the threshold value calculating section 204 calculates the four threshold values based on the maximum value, the second largest value, the minimum value, and the second smallest value among the pixel values of eight peripheral pixels included in the sorting result.

Specifically, the threshold value calculating section 204 multiplies the four pixel values by the threshold value and a coefficient set externally by the threshold value and coefficient setting section 203, for example.

Then, the threshold value calculating section 204 outputs a signal S204, which includes the calculation result of the four threshold values, to the defect determining section 205.

The defect determining section 205 determines a defect of the pixel of interest, a defect of the maximum value of a peripheral pixel with the same color as the pixel of interest, and a defect of the minimum value of a peripheral pixel with the same color as the pixel of interest. That is, the defect determining section 205 determines the case where only a pixel of interest is defective, the case where the pixel of interest and a peripheral pixel with the same color are defective (in the case of a couplet defect), and the case where there is no defect.

For example, the defect determining section 205 determines whether or not the pixel of interest is defective on the basis of the threshold value of the maximum value of peripheral pixels. For example, when the value of the pixel of interest is larger than the threshold value of the maximum value of peripheral pixels, the defect determining section 205 determines that the pixel of interest is defective.

In addition, the defect determining section 205 determines whether or not the pixel of interest is defective on the basis of the threshold value of the second largest value of peripheral pixels.

In addition, the defect determining section 205 determines whether or not the peripheral pixel of the maximum value is defective on the basis of the threshold value of the second largest value of peripheral pixels.

Through the determination described above, the defect determining section 205 can determine whether or not a white defect is included in the pixel of interest and the peripheral pixel of the maximum value with the same color.

In addition, the defect determining section 205 determines whether or not the pixel of interest is defective on the basis of the threshold value of the minimum value of peripheral pixels.

In addition, the defect determining section 205 determines whether or not the pixel of interest is defective on the basis of the threshold value of the second smallest value of peripheral pixels.

In addition, the defect determining section 205 determines whether or not the peripheral pixel of the minimum value is defective on the basis of the threshold value of the second smallest value of peripheral pixels.

Through the determination described above, the defect determining section 205 can determine whether or not a black defect is included in the pixel of interest and the peripheral pixel of the maximum value with the same color.

Then, the defect determining section 205 outputs a signal S205, which is a determination result regarding a defect of the pixel of interest and the peripheral pixel with the same color, to the defective pixel replacing section 207.

The section for calculating a candidate used in correction value calculation 206 specifies a peripheral pixel with the same color, which is used in calculating the correction value of the pixel of interest which is defective, on the basis of the edge of the processing region of 5×5 having the pixel whose defectiveness is to be determined in the middle.

In addition, processing of calculating the edge intensity in a plurality of directions regarding the processing region and selection processing, which are performed by the section for calculating a candidate used in correction value calculation 206, are the same as those of the gradient calculating section 174 in the first embodiment.

Then, the section for calculating a candidate used in correction value calculation 206 specifies two pixels, which exist in the direction of the gentlest edge specified with the pixel of interest as a reference, as peripheral pixels with the same color used in calculation of the correction value of the pixel of interest. Accordingly, the section for calculating a candidate used in correction value calculation 206 can specify a pair of pixels, which is located with the pixel of interest interposed therebetween, in the direction of the selected edge.

In addition, the section for calculating a candidate used in correction value calculation 206 outputs a signal, which includes the information indicating the specified peripheral pixels with the same color, to the defective pixel replacing section 207.

When the pixel of interest is a defective pixel, the defective pixel replacing section 207 replaces the value of the pixel of interest with the correction value.

Moreover, the defective pixel replacing section 207 calculates the correction value from the values of the pixels specified by the section for calculating a candidate used in correction value calculation 206 located at the preceding stage.

Specifically, when a defective pixel is not included in the two pixels specified by the section for calculating a candidate used in correction value calculation 206, the defective pixel replacing section 207 calculates the average value of the two pixels as the correction value.

In addition, when a defective pixel is included in the two pixels specified by the section for calculating a candidate used in correction value calculation 206, the defective pixel replacing section 207 sets the pixel value of the pixel, which is not a defective pixel, between two pixels as the correction value.

In addition, when the pixel of interest is not a defective pixel, the defective pixel replacing section 207 outputs a signal S208 of the pixel value of the pixel of interest to the subsequent stage.

In addition, when the pixel of interest is a defective pixel, the defective pixel replacing section 207 outputs the signal S208, which includes the calculated correction value as a pixel value of the pixel of interest, to the subsequent stage.

As a result, when the pixel of interest is a defective pixel, the defective pixel replacing section 207 can replace the value of the pixel of interest with the appropriate correction value, which is not based on the value of the defective pixel, and output it.

[Explanation Regarding Defect Detection and Correction Processing]

Figure 19:
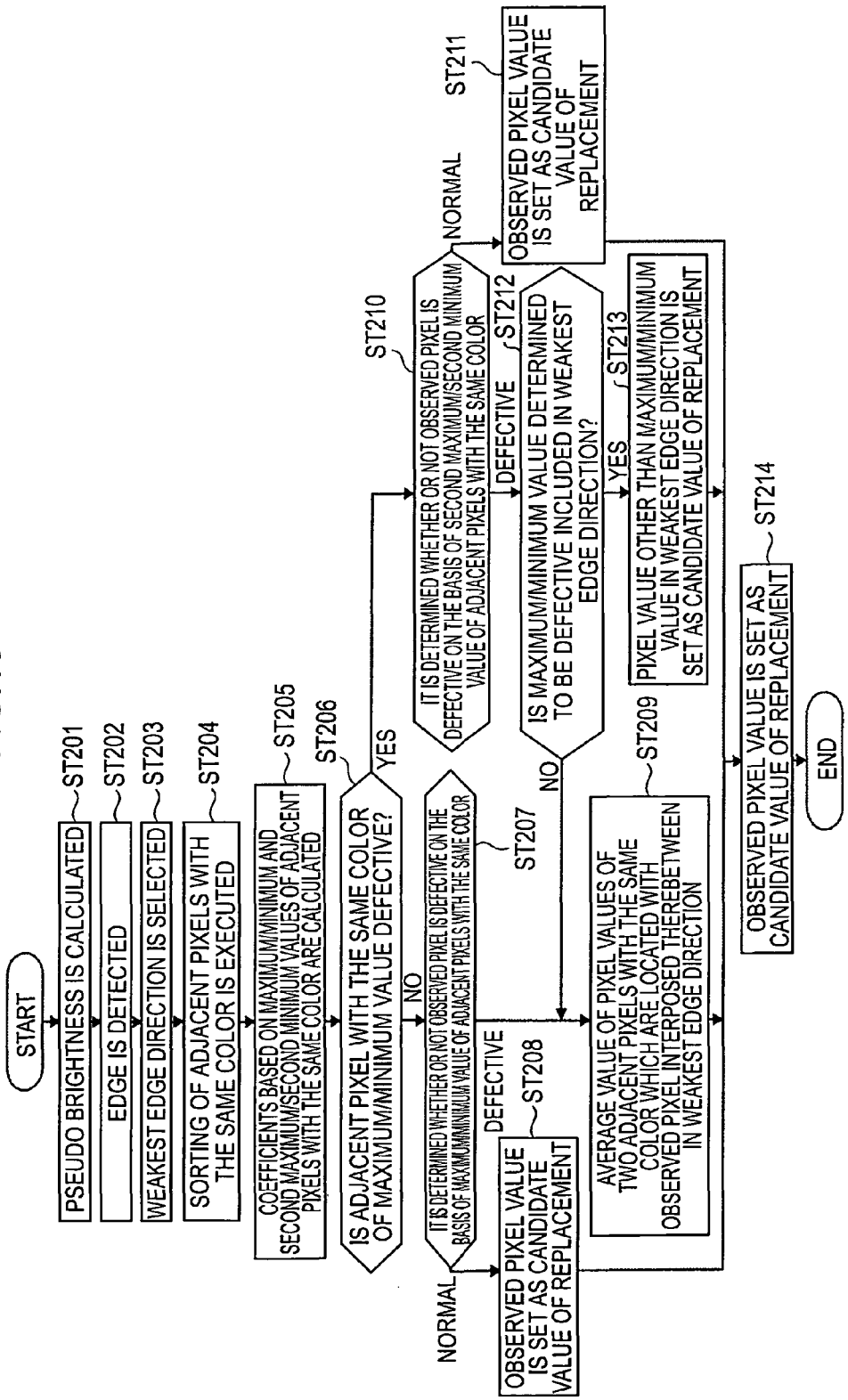
FIG. 19 is a view showing the flow chart of defect detection and correction processing of the defect detection and correction circuit according to the second embodiment.

FIG. 19 is a view showing the flow chart of defect detection and correction processing of the defect detection and correction circuit 17B in the second embodiment. The processing in FIG. 19 is repeatedly executed for all pixels which form an image.

[Step ST201]

First, in step ST201, the line buffer 201 generates the processing region PRCA of (5 pixels in the horizontal direction)×(5 pixels in the vertical direction), which has a pixel of interest (pixel whose defectiveness is to be determined DJPX) in the middle, from the Bayer arrangement signal SIM output from the pixel section 13.

The signal S201 including the information regarding the processing region PRCA generated by the line buffer 201 is output to the same-color adjacent pixel data sorting section 202 and the section for calculating a candidate used in correction value calculation 206.

Moreover, the line buffer 201 outputs a signal, which includes the information regarding the pixel of interest, to the defect determining section 205.

Then, the section for calculating a candidate used in correction value calculation 206 calculates the pseudo brightness from the pixel values of a plurality of pixels included in the processing region PRCA. In the processing region of 5 rows×5 columns, the pseudo brightness of 4 rows×4 columns is calculated.

In addition, although each pseudo brightness is calculated on the basis of the brightness values of pixels excluding a pixel of interest and peripheral pixels with the same color in the second embodiment, each pseudo brightness may be calculated from the pixel values of all pixels in the processing region of 5 rows×5 columns.

[Step ST202]

In step ST202, the section for calculating a candidate used in correction value calculation 206 calculates the edge intensities in all directions of longitudinal direction, horizontal direction, upper right direction, and upper left direction of the processing region on the basis of the pseudo brightness.

[Step ST203]

In step ST203, the section for calculating a candidate used in correction value calculation 206 selects the gentlest direction (weak direction) from the edge intensities of all directions calculated in step ST202. Specifically, a direction in which the edge intensity output value is the minimum is selected.

The section for calculating a candidate used in correction value calculation 206 outputs a signal including the direction of the selected edge to the defective pixel replacing section 207.

[Step ST204]

In step ST204, the same-color adjacent pixel data sorting section 202 selects a pixel of interest and peripheral pixels with the same color, which are included in the processing region, and sorts them in order of pixel values. Then, the same-color adjacent pixel data sorting section 202 outputs a signal S202 including the sorting result to the threshold value calculating section 204.

[Step ST205]

In step ST205, the threshold value calculating section 204 calculates the threshold value for determining a defective pixel in the processing region. The threshold value calculating section 204 calculates the four threshold values based on the maximum value, the second largest value, the minimum value, and the second smallest value among the pixel values of a plurality of peripheral pixels included in the sorting result. Then, the threshold value calculating section 204 outputs a signal S204, which includes the calculation result of the four threshold values, to the defect determining section 205.

[Step ST206]

In step ST206, the defect determining section 205 determines whether or not a defect is included in the adjacent pixels with the same color.

Specifically, the defect determining section 205 determines whether or not the adjacent pixel of the maximum value is defective on the basis of the threshold value of the second largest value of peripheral pixels.

In addition, the defect determining section 205 determines whether or not the peripheral pixel of the minimum value is defective on the basis of the threshold value of the second smallest value of peripheral pixels.

[Step ST207]

Step ST207 is a step of determining a defect of the pixel of interest which is executed by the defect determining section 205 when a defect is not included in adjacent pixels with the same color.

When a defect is not included in the adjacent pixels with the same color, the defect determining section 205 determines whether or not the pixel of interest is defective on the basis of the threshold value of the maximum value of peripheral pixels.

In addition, the defect determining section 205 determines whether or not the pixel of interest is defective on the basis of the threshold value of the minimum value of peripheral pixels.

[Step ST208]

Step ST208 is a step of acquiring the correction value which is executed by the defective pixel replacing section 207 when a defect is not included in the pixel of interest and adjacent pixels with the same color.

When a defect is not included in the pixel of interest and adjacent pixels with the same color, the defective pixel replacing section 207 acquires the pixel value of the pixel of interest as a correction value.

[Step ST209]

Step ST209 is a step of acquiring the correction value which is executed by the defective pixel replacing section 207 when only a pixel of interest is defective.

When only a pixel of interest is defective, the defective pixel replacing section 207 selects a pair of adjacent pixels with the same color, which is located with the pixel of interest interposed therebetween, in the weakest direction selected in step ST203.

In addition, the defective pixel replacing section 207 calculates the average value of the pixel values of the two selected adjacent pixels with the same color as a correction value.

[Step ST210]

Step ST210 is a step of determining a defect of the pixel of interest which is executed by the defect determining section 205 when a defect is included in adjacent pixels with the same color.

When a defect is included in adjacent pixels with the same color, the defect determining section 205 determines whether or not the pixel of interest is defective on the basis of the threshold value of the second largest value of peripheral pixels.

In addition, the defect determining section 205 determines whether or not the pixel of interest is defective on the basis of the threshold value of the second smallest value of peripheral pixels.

Accordingly, both criteria for determining a defect of a pixel of interest and criteria for determining a defect of an adjacent pixel with the same color are the second largest value or the second smallest value of adjacent pixels with the same color.

As a result, it is possible to avoid the situation where a defect of the pixel of interest is determined on the basis of the pixel value of a defective pixel, which is the maximum or the minimum, among the pixel values of a plurality of adjacent pixels with the same color. A defect of the pixel of interest can be determined on the basis of a normal pixel value.

[Step ST211]

Step ST211 is a step of acquiring the correction value which is executed by the defective pixel replacing section 207 when only an adjacent pixel with the same color is defective.

When only an adjacent pixel with the same color is defective, the defective pixel replacing section 207 acquires the pixel value of the pixel of interest as a correction value.

[Step ST212]

Step ST212 is a determination step which is executed by the defective pixel replacing section 207 when a pixel of interest and an adjacent pixel with the same color are defective.

When a pixel of interest and an adjacent pixel with the same color are defective, the defective pixel replacing section 207 determines whether or not the maximum value or the minimum determined to be defective is included in the gentlest direction selected in step ST203.

Then, when the maximum value or the minimum value determined to be defective is not included in the gentlest direction, the defective pixel replacing section 207 calculates the average value of the pixel values of two adjacent pixels with the same color, which are adjacent to each other in the gentlest direction, as a correction value through processing in step ST209.

[Step ST213]

Step ST213 is a step of acquiring the correction value which is executed by the defective pixel replacing section 207 when the maximum value or the minimum value determined to be defective is included in the gentlest direction.

When the maximum value or the minimum value determined to be defective is included in the gentlest direction, the defective pixel replacing section 207 acquires the pixel value of the adjacent pixel with the same color, which is not determined to be defective, as a correction value.

That is, the defective pixel replacing section 207 acquires the correction value from the value of a pixel other than a defective pixel among a plurality of adjacent pixels with the same color in the gentlest direction.

[Step ST214]

In step ST214, the defective pixel replacing section 207 replaces the pixel value of the pixel of interest with the correction value acquired in step ST208, ST209, ST211, or ST213.

The defective pixel replacing section 207 outputs a signal including the acquired correction value to the subsequent processing system as a pixel value of the pixel of interest.

[Example of Pixel Defect Correction]

Figure 20:
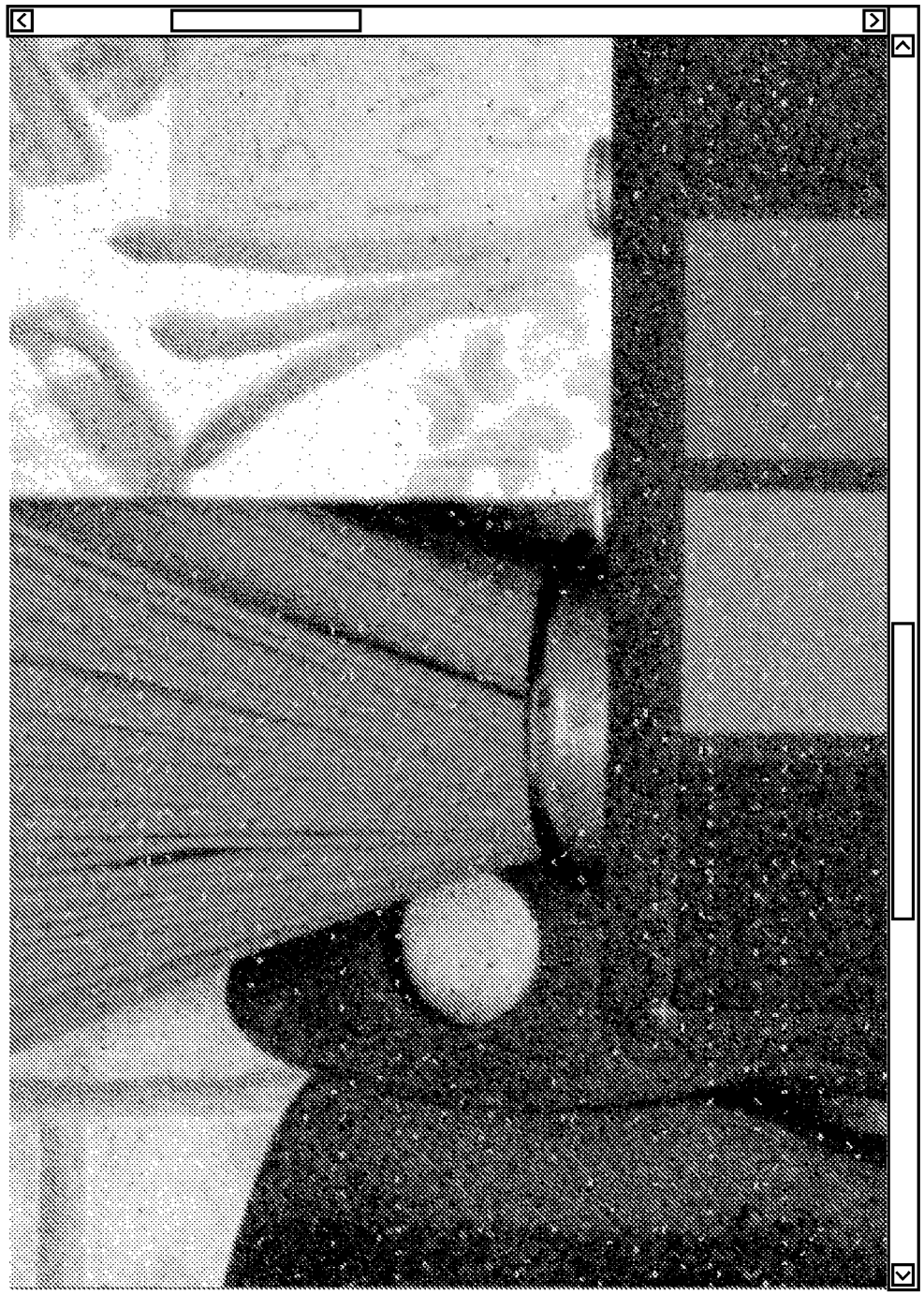
FIG. 20 shows an example of an image in which an adjacent pixel is embedded.
Figure 21:
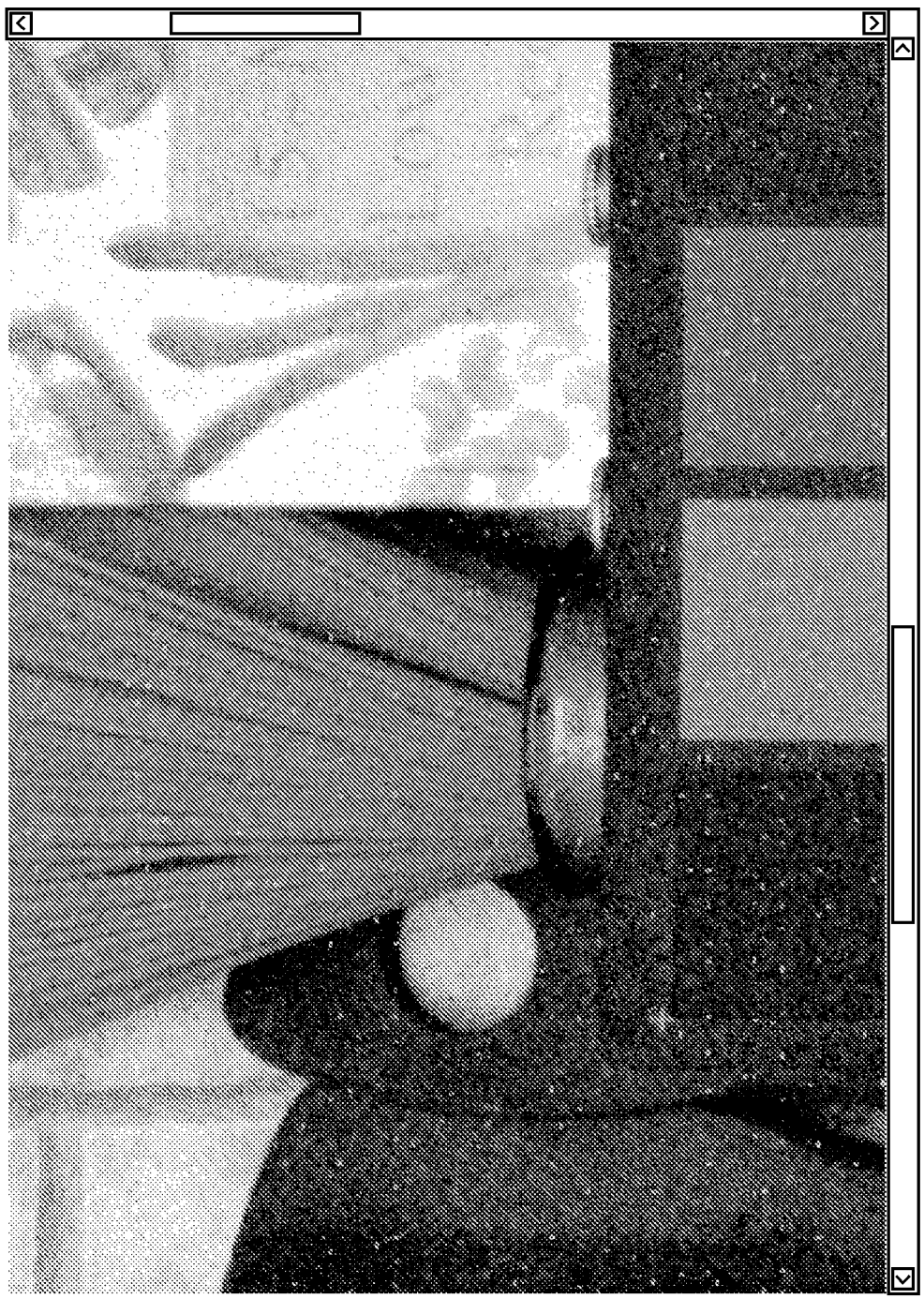
FIG. 21 shows an image obtained by correcting the image in FIG. 20 using the pixel defect correction processing in the first embodiment.
Figure 22:
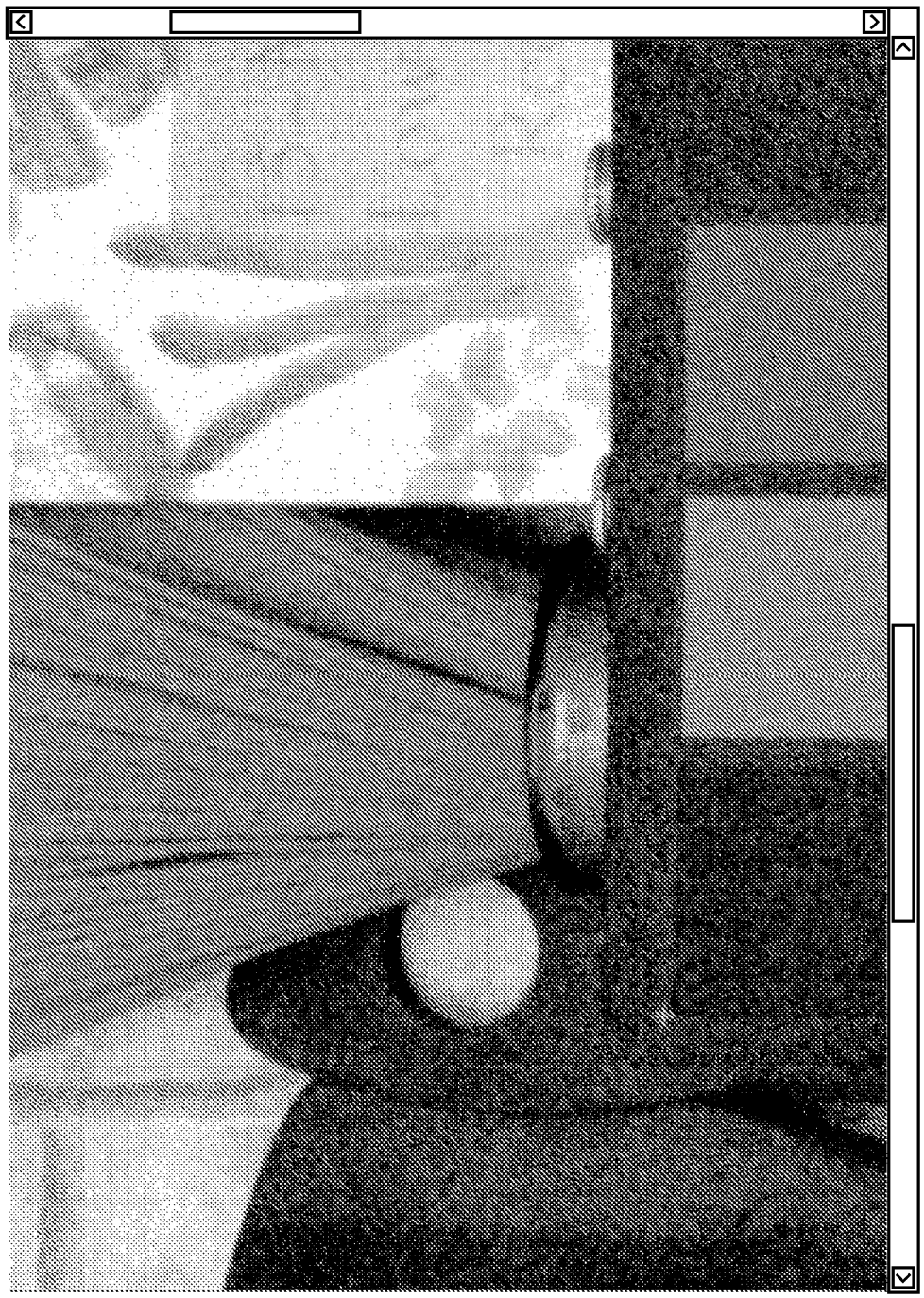
FIG. 22 shows an image obtained by correcting the image in FIG. 20 using the pixel defect correction processing in the second embodiment.

FIGS. 20 to 22 are views showing actual processing images.

FIG. 20 shows an original image. In the original image shown in FIG. 20, a pair of couplet pixel defects is embedded.

FIG. 21 shows an image obtained by correcting the image in FIG. 20 using the method according to the first embodiment.

FIG. 22 shows an image obtained by correcting the image in FIG. 20 using the method according to the second embodiment.

In the pixel defect correction method according to the first embodiment, a couplet pixel defect (defective component) remains almost as it is, as shown in FIG. 21.

On the other hand, in the pixel defect correction method according to the second embodiment, almost complete correction is realized so that the place where there is a couplet pixel defect is not clear, as shown in FIG. 22.

As described above, according to the second embodiment, the following effects can be acquired.

That is, according to the second embodiment, the pixel value determined to be defective is not used when calculating the edge. Accordingly, precision of the edge intensity is improved. As a result, since there is no sense of discomfort up to a detailed portion of an output image, the quality of the entire image is improved. In particular, this is very effective for an input image with high resolution.

Moreover, since it is not necessary to add a special complicated operation, the circuit size and the power consumption are not largely different from those in the known technique.

Moreover, in the second embodiment, the correction value of a pixel of interest is acquired without using the value of a defective pixel not only in the case where only a pixel of interest is defective but also the case where there is a couplet defect.

Therefore, in the second embodiment, the correction can be performed such that a defective component does not remain.

Moreover, the algorithm of the second embodiment can be realized by partially expanding a part of the known algorithm. In addition, it is not necessary to store the position of the maximum value or the minimum value of peripheral pixels. Accordingly, an increase in the circuit size or the power consumption can be suppressed.

Moreover, in the second embodiment, the defect determining section 205 determines a defect of a peripheral pixel of the maximum value or the minimum among a plurality of peripheral pixels, which are included in the processing region, on the basis of the second largest value or the second smallest value of peripheral pixels.

In addition, when the peripheral pixel of the maximum value or the minimum value is not defective, the defect determining section 205 determines a defect of the pixel of interest on the basis of the maximum value or the minimum value.

In addition, when the peripheral pixel of the maximum value or the minimum value is defective, the defect determining section 205 determines a defect of the pixel of interest on the basis of the second largest value or the second smallest value.

In the second embodiment, accordingly, it is possible to avoid the situation where it is determined that a pixel of interest and a peripheral pixel of the maximum value or the minimum value are defective when an image of a processing region is bright or dark on the whole.

[Explanation Regarding Another Defect Detection and Correction Processing]

The flow chart shown in FIG. 19 in the second embodiment is to correct a pixel defect in the flow corresponding to the flow chart in the first embodiment of FIG. 10. In addition, another processing of correcting a pixel defect may be considered.

FIG. 23 is a view showing the flow chart of another defect detection and correction processing of the defect detection and correction circuit 17B in the second embodiment. The processing in FIG. 23 is repeatedly executed for all pixels which form an image.

The flow of processing in FIG. 23 is suitable for the configuration of the defect detection and correction circuit 17B shown in FIG. 18, and it is executed more easily than the case where the defect detection and correction circuit 17B shown in FIG. 18 executes the processing in FIG. 19.

[Step ST301]

In step ST301 shown in FIG. 23, the same-color adjacent pixel data sorting section 202 selects a pixel of interest and peripheral pixels with the same color, which are included in the processing region, and sorts them in order of pixel values.

[Step ST302]

In step ST302, the threshold value calculating section 302 calculates the threshold value for determining a defective pixel in the processing region.

Specifically, the threshold value calculating section 204 calculates the four threshold values based on the maximum value, the second largest value, the minimum value, and the second smallest value among the pixel values of a plurality of peripheral pixels included in the sorting result.

[Step ST303]

In step ST303, the defect determining section 205 determines whether or not a defect is included in the pixel of interest and the adjacent pixels with the same color.

In this case, the defect determining section 205 determines the following three things in order to determine a white defect and generates the determination result data (x1, x2, x3) of three bits.

1. A white defect of a pixel of interest is determined on the basis of the threshold value of the maximum value of peripheral pixels (x1).

2. A white defect of a pixel of interest is determined on the basis of the threshold value of the second largest value of peripheral pixels (x2).

3. A white defect of an adjacent pixel of the maximum value is determined on the basis of the threshold value of the second largest value of peripheral pixels (x3).

Moreover, the defect determining section 205 determines the following three things in order to determine a black defect and generates the determination result data (y1, y2, y3) of three bits.

4. A black defect of a pixel of interest is determined on the basis of the threshold value of the minimum value of peripheral pixels (y1).

5. A black defect of a pixel of interest is determined on the basis of the threshold value of the second smallest value of peripheral pixels (y2).

6. A black defect of a peripheral pixel of the minimum value is determined on the basis of the threshold value of the second smallest value of peripheral pixels (y3).

Here, when the determination result data (x1, x2, x3) and (y1, y2, y3) are (1, X, 0) (where, X is 0 or 1), there is no defect in peripheral pixels and only a pixel of interest is defective (normal defect).

Moreover, when the determination result data (x1, x2, x3) and (y1, y2, y3) are (0, 1, 1), the peripheral pixels and the pixel of interest are defective (adjacent defects).

Moreover, when the determination result data (x1, x2, x3) and (y1, y2, y3) are (0, 0, 0), the peripheral pixels and the pixel of interest are not defective (non correction).

[Step ST304]

Step ST304 is a step executed when the determination result data in step ST303 indicates a normal defect.

In step ST304, the section for calculating a candidate used in correction value calculation 206 calculates the edge intensities in all directions of longitudinal direction, horizontal direction, upper right direction, and upper left direction of the processing region on the basis of the pseudo brightness. In addition, the section for calculating a candidate used in correction value calculation 206 selects the gentlest direction from the calculated edge intensities of all directions.

Moreover, as normal defect correction processing, the defective pixel replacing section 207 calculates the average value of a plurality of adjacent pixels with the same color in the gentlest direction.

[Step ST305]

Step ST305 is a step executed when the determination result data in step ST303 indicates an adjacent defect.

In step ST305, the section for calculating a candidate used in correction value calculation 206 calculates the edge intensities in all directions of longitudinal direction, horizontal direction, upper right direction, and upper left direction of the processing region on the basis of the pseudo brightness. In addition, the section for calculating a candidate used in correction value calculation 206 selects the gentlest direction from the calculated edge intensities of all directions.

Moreover, as adjacent defect correction processing, the defective pixel replacing section 207 acquires the pixel value of a pixel, which is not defective, among the plurality of adjacent pixels with the same color in the gentlest direction.

Moreover, in step ST305, the defective pixel replacing section 207 may execute exception processing of adjacent defect correction processing when a plurality of high-brightness pixels are included in adjacent pixels with different colors or adjacent pixels with the same color.

For example, when the maximum value and the second largest value of adjacent pixels with different colors and the value of a pixel of interest are all high brightness, an image of a processing range is considered to be a bright solid pattern image.

In addition, when the minimum value and the second smallest value of adjacent pixels with different colors and the value of a pixel of interest are all low brightness, an image of a processing range is considered to be a dark solid pattern image.

In these cases, preferably, the defective pixel replacing section 207 performs normal defect correction processing or no correction as exception processing.

[Step ST306]

In step ST306, the defective pixel replacing section 207 replaces the pixel value of the pixel of interest using the correction values acquired in steps ST304 and ST305.

[Step ST307]

In step ST307, the defective pixel replacing section 207 outputs a signal including the acquired correction value or a signal including the pixel value of the pixel of interest, which is not defective, to the subsequent processing system as a pixel value of the pixel of interest.

Thus, in the pixel defect correction processing shown in FIG. 23, three kinds of determination are executed in one step when the defect determining section 205 determines a defect. Accordingly, the pixel defect correction processing shown in FIG. 23 is suitable for the configuration of the defect detection and correction circuit 17B shown in FIG. 18.

While the embodiments described above are examples of a preferred embodiment of the present invention, the present invention is not limited thereto but various modifications and changes may be made without departing from the spirit and scope of the present invention.

For example, each embodiment described above is applied to a solid state imaging apparatus which uses a CMOS image sensor as an image sensor (solid state imaging device).

The solid state imaging apparatus may be applied to apparatuses having various imaging functions, such as a mobile phone, a video camera, and a digital still camera, for example.

Moreover, the method of each embodiment described in detail above may also be realized as a program according to the above procedures which is executed by a computer, such as a CPU.

In addition, such a program may be recorded in recording media, such as semiconductor memory, a magnetic disk, an optical disk, and a floppy (registered trademark) disk, and a computer with the recording media set therein may access and execute the program.

In the second embodiment, when a pixel of interest and an adjacent pixel with the same color are defective, defects of these pixels are determined on the basis of the threshold value of the second value of adjacent pixels with the same color.

In addition, for example, when a plurality of peripheral pixels with the same color included in the processing region are arrayed in order of their values, a defect of a pixel related to each processing may be determined with an n-th (n is a natural number of 3 or more) largest value or an n-th smallest value of the arrangement as a reference.

For example, defects of a plurality of peripheral pixels from the maximum value or the minimum value to the (n−1)-th value and a defect of a pixel of interest, among a plurality of peripheral pixels included in the processing region, may be determined on the basis of the n-th largest value of the peripheral pixels.

In this case, for example, even when (n−1) defects are included in adjacent pixels with the same color, these defects may be appropriately determined on the basis of the n-th value considered to be normal.

For example, when the third value is a reference, triplet defects caused by defects of a pixel of interest and two peripheral pixels may be determined.

Similar to the gradient calculating section 174 in the first embodiment, the section for calculating a candidate used in correction value calculation 206 in the second embodiment calculates the pseudo brightness on the basis of the pixel value of a peripheral pixel with a different color excluding a peripheral pixel with the same color as a pixel of interest and calculates the edge intensity in a plurality of directions of the processing region.

Moreover, for example, the section for calculating a candidate used in correction value calculation 206 may calculate the pseudo brightness including a peripheral pixel with the same color as a pixel of interest and may calculate the gradient in a plurality of directions of the processing region.

The present application contains subject matter related to those disclosed in Japanese Priority Patent Application JP 2009-252448 and JP 2010-085351 filed in the Japan Patent Office on Nov. 2, 2009 and Apr. 1, 2010, respectively, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A pixel defect correction device comprising:
    a defect determining section that determines whether or not a pixel of interest of an image, in which a plurality of pixels each having a pixel value are arrayed in a two-dimensional manner, is a defect of the image;
    a gradient detecting section that detects a gradient or an edge in a processing region, which includes a plurality of pixels with the pixel of interest in the middle, on the basis of values of at least peripheral pixels around the pixel of interest which are included in the processing region;
    a correction value acquisition section that selects a pixel, which is used for acquisition of a correction value of the pixel of interest, according to the detected gradient or edge and acquires the correction value from a value of the selected pixel; and
    a defective pixel replacing section that replaces the value of the pixel of interest with the correction value when the pixel of interest is determined to be a defect of the image, and
    wherein the gradient detecting section detects the gradient or the edge of the processing region on the basis of a value of a peripheral pixel with a different color from the pixel of interest, and
    wherein in order to detect the gradient or the edge in the processing region, the gradient detecting section acquires gradients or edges for a plurality of directions in the processing region on the basis of a value of a peripheral pixel with a different color from the pixel of interest included in the processing region and selects a direction, which corresponds to the gentlest gradient or edge, from the acquired gradients or edges in the plurality of directions.

2. The pixel defect correction device according to claim 1, wherein each of the plurality of pixels of the image corresponds to a color selected from a predetermined number of colors.

3. The pixel defect correction device according to claim 1, the correction value acquisition section selects a pixel with the same color as the pixel of interest, which exists in a direction of the gentlest gradient or edge, with the pixel of interest as a reference.

4. The pixel defect correction device according to claim 3, wherein the gradient detecting section acquires gradients or edges in four directions including a longitudinal direction, a horizontal direction, a right oblique direction, and a left oblique direction in the pixel arrangement of the processing region.

5. The pixel defect correction device according to claim 2, wherein when a defective pixel with the same color as the pixel of interest is included in the direction of the gentlest gradient or edge with the pixel of interest as a reference, the gradient detecting section changes the direction of the selected gradient or edge to another direction.

6. The pixel defect correction device according to claim 2, wherein the correction value acquisition section acquires an average value of values of a plurality of peripheral pixels with the same color as the pixel of interest in the processing region.

7. The pixel defect correction device according to claim 6, wherein the correction value acquisition section acquires the average value from the values of the plurality of peripheral pixels, which have the same color as the pixel of interest in the processing region, excluding at least a maximum value and a minimum value.

8. The pixel defect correction device according to claim 1, wherein the correction value acquisition section selects a plurality of pixels existing in the direction of the gradient or the edge detected by the gradient detecting section with the pixel of interest as a reference and acquires an average value of values of the plurality of pixels as the correction value.

9. The pixel defect correction device according to claim 8, wherein the correction value acquisition section determines whether or not a defective pixel is included in the plurality of pixels existing in the direction of the gradient or the edge with the pixel of interest as a reference and acquires the correction value from the values of pixels other than the defective pixel among the plurality of pixels when a defective pixel is included in the plurality of pixels.

10. The pixel defect correction device according to claim 9, wherein the correction value acquisition section determines a defect of a peripheral pixel of a maximum value or a minimum value, among a plurality of peripheral pixels included in the processing region, on the basis of a second largest value or a second smallest value of the peripheral pixels, and
    the defect determining section determines a defect of the pixel of interest on the basis of the maximum value or the minimum value when the peripheral pixel of the maximum value or the minimum value is not defective, and determines a defect of the pixel of interest on the basis of the second largest value or the second smallest value when the peripheral pixel of the maximum value or the minimum value is defective.

11. The pixel defect correction device according to claim 9, wherein the correction value acquisition section determines defects of a plurality of peripheral pixels from a maximum value or a minimum value to an $(n-1)$-th ($n$ is a natural number of 2 or more) value, among a plurality of peripheral pixels included in the processing region, on the basis of an n-th largest or smallest value of peripheral pixels, and
    the defect determining section determines a defect of the pixel of interest on the basis of the maximum value or the minimum value when the peripheral pixel of the maximum value or the minimum value is not defective, and determines a defect of the pixel of interest on the basis of the n-th largest or smallest value when the peripheral pixel of the maximum value or the minimum value is defective.

12. An imaging apparatus comprising:
    a pixel section including an imaging device which images a subject image; and
    a pixel defect correction device that receives image data from the imaging device and performs pixel defect correction processing, wherein the pixel defect correction device includes
a defect determining section that determines whether or not a pixel of interest of an image, in which a plurality of pixels each having a pixel value are arrayed in a two-dimensional manner, is a defect of the image,
a gradient detecting section that detects a gradient or an edge in a processing region, which includes a plurality of pixels with the pixel of interest in the middle, on the basis of values of at least peripheral pixels around the pixel of interest which are included in the processing region,
a correction value acquisition section that selects a pixel, which is used for acquisition of a correction value of the pixel of interest, according to the detected gradient or edge and acquires the correction value from a value of the selected pixel, and
a defective pixel replacing section that replaces the value of the pixel of interest with the correction value when the pixel of interest is determined to be a defect of the image,
wherein the gradient detecting section detects the gradient or the edge of the processing region on the basis of a value of a peripheral pixel with a different color from the pixel of interest, and
wherein in order to detect the gradient or the edge in the processing region, the gradient detecting section acquires gradients or edges for a plurality of directions in the processing region on the basis of a value of a peripheral pixel with a different color from the pixel of interest included in the processing region and selects a direction, which corresponds to the gentlest gradient or edge, from the acquired gradients or edges in the plurality of directions.

13. A pixel defect correction method comprising the steps of:
determining whether or not a pixel of interest of an image, in which a plurality of pixels each having a pixel value are arrayed in a two-dimensional manner, is a defect of the image;
detecting a gradient or an edge in a processing region, which includes a plurality of pixels with the pixel of interest in the middle, on the basis of values of at least peripheral pixels around the pixel of interest which are included in the processing region;
selecting a pixel, which is used for acquisition of a correction value of the pixel of interest, according to the detected gradient or edge and acquiring the correction value from a value of the selected pixel; and
replacing the value of the pixel of interest with the correction value when the pixel of interest is determined to be a defect of the image,
wherein said detecting the gradient includes detecting the gradient or the edge of the processing region on the basis of a value of a peripheral pixel with a different color from the pixel of interest, and
wherein said detecting the gradient includes acquiring gradients or edges for a plurality of directions in the processing region on the basis of a value of a peripheral pixel with a different color from the pixel of interest included in the processing region and selecting a direction, which corresponds to the gentlest gradient or edge, from the acquired gradients or edges in the plurality of directions.

14. A non-transitory computer readable medium storing a program that is executable by a computer to perform pixel defect correction processing including:
defect determination processing for determining whether or not a pixel of interest of an image, in which a plurality of pixels each having a pixel value are arrayed in a two-dimensional manner, is a defect of the image;
direction detection processing for detecting a gradient or an edge in a processing region, which includes a plurality of pixels with the pixel of interest in the middle, on the basis of values of at least peripheral pixels around the pixel of interest which are included in the processing region;
correction value acquisition processing for selecting a pixel, which is used for acquisition of a correction value of the pixel of interest, according to the detected gradient or edge and acquiring the correction value from a value of the selected pixel; and
replacement processing for replacing the value of the pixel of interest with the correction value when the pixel of interest is determined to be a defect of the image,
wherein said direction detection processing detects the gradient or the edge of the processing region on the basis of a value of a peripheral pixel with a different color from the pixel of interest, and
wherein said direction detection processing includes acquiring gradients or edges for a plurality of directions in the processing region on the basis of a value of a peripheral pixel with a different color from the pixel of interest included in the processing region and selecting a direction, which corresponds to the gentlest gradient or edge, from the acquired gradients or edges in the plurality of directions.

15. The imaging apparatus according to claim 12, wherein each of the plurality of pixels of the image corresponds to a color selected from a predetermined number of colors.

16. The imaging apparatus according to claim 12, wherein the correction value acquisition section selects a pixel with the same color as the pixel of interest, which exists in a direction of the gentlest gradient or edge, with the pixel of interest as a reference.

17. The imaging apparatus according to claim 16, wherein the gradient detecting section acquires gradients or edges in four directions including a longitudinal direction, a horizontal direction, a right oblique direction, and a left oblique direction in the pixel arrangement of the processing region.

18. The imaging apparatus according to claim 15, wherein when a defective pixel with the same color as the pixel of interest is included in the direction of the gentlest gradient or edge with the pixel of interest as a reference, the gradient detecting section changes the direction of the selected gradient or edge to another direction.

19. The imaging apparatus according to claim 15, wherein the correction value acquisition section acquires an average value of values of a plurality of peripheral pixels with the same color as the pixel of interest in the processing region.

20. The imaging apparatus according to claim 19, wherein the correction value acquisition section acquires the average value from the values of the plurality of peripheral pixels, which have the same color as the pixel of interest in the processing region, excluding at least a maximum value and a minimum value.

21. The imaging apparatus according to claim 12, wherein the correction value acquisition section selects a plurality of pixels existing in the direction of the gradient or the edge detected by the gradient detecting section with the pixel of interest as a reference and acquires an average value of values of the plurality of pixels as the correction value.

22. The imaging apparatus according to claim 21, wherein the correction value acquisition section determines whether or not a defective pixel is included in the plurality of pixels existing in the direction of the gradient or the edge with the pixel of interest as a reference and acquires the correction value from the values of pixels other than the defective pixel among the plurality of pixels when a defective pixel is included in the plurality of pixels.

23. The imaging apparatus according to claim 22, wherein the correction value acquisition section determines a defect of a peripheral pixel of a maximum value or a minimum value, among a plurality of peripheral pixels included in the processing region, on the basis of a second largest value or a second smallest value of the peripheral pixels, and
the defect determining section determines a defect of the pixel of interest on the basis of the maximum value or the minimum value when the peripheral pixel of the maximum value or the minimum value is not defective, and determines a defect of the pixel of interest on the basis of the second largest value or the second smallest value when the peripheral pixel of the maximum value or the minimum value is defective.

24. The imaging apparatus according to claim 22, wherein: the correction value acquisition section determines defects of a plurality of peripheral pixels from a maximum value or a minimum value to an (n−1)-th (n is a natural number of 2 or more) value, among a plurality of peripheral pixels included in the processing region, on the basis of an n- th largest or smallest value of peripheral pixels, and
the defect determining section determines a defect of the pixel of interest on the basis of the maximum value or the minimum value when the peripheral pixel of the maximum value or the minimum value is not defective, and determines a defect of the pixel of interest on the basis of the n-th largest or smallest value when the peripheral pixel of the maximum value or the minimum value is defective.

25. The method according to claim 13, wherein each of the plurality of pixels of the image corresponds to a color selected from a predetermined number of colors.

26. The method according to claim 13, wherein said selecting the pixel comprising selecting the pixel with the same color as the pixel of interest, which exists in a direction of the gentlest gradient or edge, with the pixel of interest as a reference.

27. The method according to claim 26, wherein said detecting the gradient comprises acquiring gradients or edges in four directions including a longitudinal direction, a horizontal direction, a right oblique direction, and a left oblique direction in the pixel arrangement of the processing region.

28. The method according to claim 25, wherein when a defective pixel with the same color as the pixel of interest is included in the direction of the gentlest gradient or edge with the pixel of interest as a reference, and wherein said detecting the gradient comprises changing the direction of the selected gradient or edge to another direction.

29. The method according to claim 25, wherein said selecting the pixel comprises acquiring an average value of values of a plurality of peripheral pixels with the same color as the pixel of interest in the processing region.

30. The method according to claim 29, wherein said selecting the pixel comprises acquiring the average value from the values of the plurality of peripheral pixels, which have the same color as the pixel of interest in the processing region, excluding at least a maximum value and a minimum value.

31. The method according to claim 13, wherein said selecting the pixel comprises selecting a plurality of pixels existing in the direction of the gradient or the edge detected by the gradient detecting with the pixel of interest as a reference and acquires an average value of values of the plurality of pixels as the correction value.

32. The method according to claim 31, wherein said selecting the pixel comprises determining whether or not a defective pixel is included in the plurality of pixels existing in the direction of the gradient or the edge with the pixel of interest as a reference and acquires the correction value from the values of pixels other than the defective pixel among the plurality of pixels when a defective pixel is included in the plurality of pixels.

33. The method according to claim 32, wherein said selecting the pixel comprises determining a defect of a peripheral pixel of a maximum value or a minimum value, among a plurality of peripheral pixels included in the processing region, on the basis of a second largest value or a second smallest value of the peripheral pixels, and
said determining whether or not the pixel of the image is a defect of the image comprises determining a defect of the pixel of interest on the basis of the maximum value or the minimum value when the peripheral pixel of the maximum value or the minimum value is not defective, and determines a defect of the pixel of interest on the basis of the second largest value or the second smallest value when the peripheral pixel of the maximum value or the minimum value is defective.

34. The method according to claim 32, wherein: said selecting the pixel comprises determining defects of a plurality of peripheral pixels from a maximum value or a minimum value to an (n−1)-th (n is a natural number of 2 or more) value, among a plurality of peripheral pixels included in the processing region, on the basis of an n-th largest or smallest value of peripheral pixels, and
said determining whether or not the pixel of the image is a defect of the image comprises determining a defect of the pixel of interest on the basis of the maximum value or the minimum value when the peripheral pixel of the maximum value or the minimum value is not defective, and determines a defect of the pixel of interest on the basis of the n-th largest or smallest value when the peripheral pixel of the maximum value or the minimum value is defective.

35. The computer readable medium according to claim 14, wherein each of the plurality of pixels of the image corresponds to a color selected from a predetermined number of colors.

36. The computer readable medium according to claim 14, wherein the correction value acquisition processing selects a pixel with the same color as the pixel of interest, which exists in a direction of the gentlest gradient or edge, with the pixel of interest as a reference.

37. The computer readable medium according to claim 36, wherein the direction detecting processing acquires gradients or edges in four directions including a longitudinal direction, a horizontal direction, a right oblique direction, and a left oblique direction in the pixel arrangement of the processing region.

38. The computer readable medium according to claim 35, wherein when a defective pixel with the same color as the pixel of interest is included in the direction of the gentlest gradient or edge with the pixel of interest as a reference, the direction detecting processing detects the direction of the selected gradient or edge to another direction.

39. The computer readable medium according to claim 35, wherein the correction value acquisition processing acquires an average value of values of a plurality of peripheral pixels with the same color as the pixel of interest in the processing region.

40. The computer readable medium according to claim 39, wherein the correction value acquisition processing acquires the average value from the values of the plurality of peripheral pixels, which have the same color as the pixel of interest in the processing region, excluding at least a maximum value and a minimum value.

41. The computer readable medium according to claim 14, wherein the correction value acquisition processing selects a plurality of pixels existing in the direction of the gradient or the edge detected by the direction detecting processing with the pixel of interest as a reference and acquires an average value of values of the plurality of pixels as the correction value.

42. The computer readable medium according to claim 41, wherein the correction value acquisition processing determines whether or not a defective pixel is included in the plurality of pixels existing in the direction of the gradient or the edge with the pixel of interest as a reference and acquires the correction value from the values of pixels other than the defective pixel among the plurality of pixels when a defective pixel is included in the plurality of pixels.

43. The computer readable medium according to claim 42, wherein the correction value acquisition processing determines a defect of a peripheral pixel of a maximum value or a minimum value, among a plurality of peripheral pixels included in the processing region, on the basis of a second largest value or a second smallest value of the peripheral pixels, and the defect determination processing determines a defect of the pixel of interest on the basis of the maximum value or the minimum value when the peripheral pixel of the maximum value or the minimum value is not defective, and determines a defect of the pixel of interest on the basis of the second largest value or the second smallest value when the peripheral pixel of the maximum value or the minimum value is defective.

44. The computer readable medium according to claim 42, wherein: the correction value acquisition processing determines defects of a plurality of peripheral pixels from a maximum value or a minimum value to an (n−1)-th (n is a natural number of 2 or more) value, among a plurality of peripheral pixels included in the processing region, on the basis of an n-th largest or smallest value of peripheral pixels, and the defect determination processing determines a defect of the pixel of interest on the basis of the maximum value or the minimum value when the peripheral pixel of the maximum value or the minimum value is not defective, and determines a defect of the pixel of interest on the basis of the n-th largest or smallest value when the peripheral pixel of the maximum value or the minimum value is defective.

* * * * *